United States Patent Office 2,828,283
Patented Mar. 25, 1958

2,828,283

CERTAIN POLYEPOXIDE MODIFIED PHENOL-ALDEHYDE RESINS, THEIR OXYALKYLATION DERIVATIVES, AND METHOD OF MAKING SAME

Melvin De Groote, St. Louis, and Kwan-Ting Shen, Brentwood, Mo., assignors to Petrolite Corporation, Wilmington, Del., a corporation of Delaware No Drawing. Original application December 8, 1952, Serial No. 324,814. Divided and this application May 3, 1956, Serial No. 582,349

14 Claims. (Cl. 260—53)

This application is a division of our co-pending application Serial No. 324,814, filed December 8, 1952, now abandoned.

Our invention is concerned with new chemical products or compounds useful as demulsifying agents in processes or procedures particularly adapted for preventing, breaking or resolving emulsions of the water-in-oil type, and particularly petroleum emulsions. Our invention is also concerned with the application of such chemical products or compounds in various other arts and industries as well as with methods of manufacturing the new chemical products or compounds which are of outstanding value in demulsification.

The products of our invention are oxyalkylation derivatives of the reaction products of certain phenolaldehyde resins, hereinafter described in detail with certain phenolic polyepoxides, also hereinafter described in detail. Of particular importance are the oxyalkylation derivatives of the reaction products of phenol-aldehyde resins derived from difunctional monohydric phenols and aldehydes having not over 8 carbon atoms, particularly, formaldehyde, in which the difunctional monohydric phenol residue is derived from a hydrocarbon substituted phenol with phenolic diepoxides of the following formula:

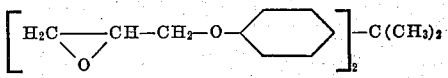

and cogenerically associated compounds formed in its preparation.

The products previously described, which are obtained by oxyalkylation and which, in turn, are useful for various purposes including the resolution of petroleum emulsions of the water-in-oil type, are obtained from certain heat-stable resins, which, since they are heat-stable, are also susceptible to reaction in various ways to yield products other than oxyalkylation products, such as imine derivatives. Such imine derivatives may be obtained, for example, by subjecting the resins to reaction with ethylene imine, propylene imine, or similar imines rather than reaction with ethylene oxide, propylene oxide, etc. Comparable compounds are obtained by derivatives which, in addition to having the imine radical, have an ether linkage such as

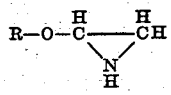

wherein R is a comparatively small acyl radical, sucn as methyl, ethyl, propyl, etc. In light of this fact, i. e., that the reaction products of the selected resins herein described and the epoxides are apparently new per se and may be utilized in a manner other than specifically described herein, it is obvious they represent part of the instant invention. The resultants obtained by reaction between the resinous materials and the imine type reactant exemplify new compounds having properties usually found in cationic surface-active agents and can be used for the purposes for which these materials are commonly employed. The materials so obtained are still susceptible to oxyalkylation with an alkylene oxide, such as ethylene oxide, propylene oxide, etc., and can be reacted with these oxides in the same manner as herein described in connection with the resinous materials which have not been subjected to the intermediate reaction with an imine.

Actually any reference in the claims or specification to the property of being "oxyalkylation-susceptible" might just as properly be characterized as being "imine-reactive" or for that matter as "oxyalkylation-susceptible and imine-reactive."

The products derived by reaction between the resins and the polyepoxides have been characterized as being acylation-susceptible as well as oxyalkylation-susceptible. This is due to the fact that reaction yields, on the average, 2 or more alcoholic hydroxyl groups per molecule. Such aliphatic hydroxyl groups as differentiated from phenolic hydroxyl groups are particularly susceptible to acylation with various carboxylic and noncarboxylic acids. They may be reacted with detergent-forming monocarboxy acids, particularly higher fatty acids, which are saturated or unsaturated, as well as polycarboxy acids, such as phthalic anhydride, maleic anhydride, etc. Similarly, they can be reacted with maleic acid or a fractional maleic acid ester, such as the monooctyl ester of maleic acid, and the neutral ester obtained can be reacted with sodium bisulfite so as to introduce a sulfonic group.

Thus, another phase of the present invention relates to such resinous compounds and the method of making same.

Notwithstanding the fact that subsequent data will be presented in considerable detail, yet the description becomes somewhat involved and certain facts should be kept in mind. The epoxides, and particularly the diepoxides may have no connecting bridge between the phenolic nuclei as in the case of a diphenyl derivative or may have a variety of connecting bridges, i. e., divalent linking radicals. Our preference is that either diphenyl compounds be employed or else compounds where the divalent link is obtained by the removal of a carbonyl oxygen atom as derived from a ketone or aldehyde.

If it were not for the expense involved in preparing and purifying the monomer we would prefer it to any other form, i. e., in preference to the polymer or mixture of polymer and monomer.

Stated another way we would prefer to use materials of the kind described, for example in U. S. Patent 2,530,353, dated November 14, 1950. Said patent describes compounds having the general formula

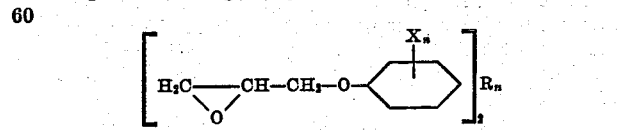

wherein R is an aliphatic hydrocarbon bridge, each $n$ independently has one of the values 0 and 1, and X is an alkyl radical containing from 1 to 4 carbon atoms, The patents hereinafter referred to as concerned with polyepoxides are included in the list immediately following:

| U. S. Patent No. | Dated | Inventor |
| --- | --- | --- |
| 2,122,958 | July 5, 1938 | Schafer. |
| 2,139,766 | December 13, 1938 | Mikeska et al. |
| 2,174,248 | September 26, 1939 | Do. |
| 2,195,539 | April 2, 1940 | Do. |
| 2,207,719 | July 16, 1940 | Cohen et al. |
| 2,244,021 | June 3, 1941 | Rosen et al. |
| 2,246,321 | June 17, 1941 | Rosen. |
| 2,285,563 | June 9, 1942 | Britton et al. |
| 2,430,002 | November 4, 1947 | De Groote et al. |
| 2,457,329 | December 28, 1948 | Swern et al. |
| 2,462,047 | February 15, 1949 | Wyler. |
| 2,462,048 | do | Do. |
| 2,482,748 | September 27, 1949 | Dietzler. |
| 2,488,134 | November 15, 1949 | Mikeska et al. |
| 2,503,196 | April 4, 1950 | Dietzler et al. |
| 2,504,064 | April 11, 1950 | Bock et al. |
| 2,506,486 | May 2, 1950 | Bender et al. |
| 2,515,906 | July 18, 1950 | Stevens et al. |
| 2,515,907 | do | Do. |
| 2,515,908 | do | Do. |
| 2,526,545 | October 17, 1950 | Dietzler. |
| 2,530,353 | November 14, 1950 | Havens. |
| 2,564,191 | August 14, 1951 | De Groote et al. |
| 2,575,558 | November 20, 1951 | Newey et al. |
| 2,581,464 | January 8, 1952 | Zech. |
| 2,581,919 | do | Albert. |
| 2,582,985 | January 22, 1952 | Greenlee. |

The compounds having two oxirane rings and employed for combination with the phenol-aldehyde resin are compounds of the following formula and cogenerically associated compounds formed in their preparation:

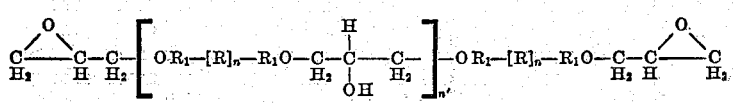

in which R represents a divalent radical including ketone residues formed by the elimination of the ketonic oxygen atom and aldehyde residues obtained by the elimination of the aldehydic oxygen atom, the divalent radical

the divalent

radical, the divalent sulfone radical, and the divalent monosulfide radical —S—, the divalent radical —CH$_2$SCH$_2$—, and the divalent disulfide radical —S—S—; and R$_1$O is the divalent radical obtained by the elimination of a hydroxyl hydrogen atom and a nuclear hydrogen atom from the phenol

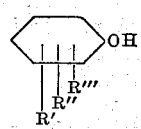

in which R', and R", and R''' represent hydrogen and hydrocarbon substituents of the aromatic nucleus, said substituent member having not over 18 carbon atoms; n represents an integer including zero and 1, and n' represents a whole number not greater than 3. The above mentioned compounds and those congenerically associated compounds formed in their preparation are thermoplastic and organic solvent soluble. Reference to being thermoplastic characterizes them as being liquids at ordinary temperature or readily convertible to liquids by merely heating below the point of pyrolysis and thus differentiates them from infusible resins. Reference to being soluble in an organic solvent means any of the usual organic solvents, such as alcohols, ketones, esters, ethers, mixed solvents, etc. Reference to solubility is merely to differentiate from a reactant which is not soluble and might be not only insoluble but also infusible. Furthermore, solubility is a factor insofar that it is sometimes desirable to dilute the compound containing the epoxy rings before reacting with amine. In such instances, of course, the solvent selected would have to be one which is not susceptible to oxyalkylation, as for example, kerosene, benzene, toluene, dioxane, various ketones, chlorinated solvents, dibutyl ether, dihexyl ether, ethyleneglycol diethylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter the word "epoxy" unless indicated otherwise, will be used to mean the oxirane ring, i. e., the 1,2-epoxy ring. Furthermore, where a compound has two or more oxirane rings they will be referred to as polyepoxides. They usually represent, of course, 1,2-epoxide rings or oxirane rings in the alpha-omega position. This is a departure, of course, from the standpoint of a strictly formal nomenclature as in the example of the simplest diepoxide which contains at least 4 carbon atoms and is formally described as 1,2-epoxy-3,4-epoxybutane (1,2,3,4 diepoxybutane).

It well may be that even though the previously suggested formula represents the principal component, or components, of the resultant or reaction product described in the previous text, it may be important to note that somewhat similar compounds, generally of much higher molecular weight, have been described as complex resinous epoxides which are polyether derivatives of polyhydric phenols containing an average of more than one epoxide group per molecule and free from functional groups other than epoxide and hydroxyl groups. See U. S. Patent No. 2,494,295, dated January 10, 1950, to Greenlee. The compounds here included are limited to the monomers or the low molal members of such series and generally contain two epoxide rings per molecule and may be entirely free from a hydroxyl group. This is important because the instant invention is directed towards products which are not resins and have certain solubility characteristics not inherent in resins. Note, for example, that said U. S. Patent No. 2,494,295 describes products wherein the epoxide derivative can combine with a sulfonamide resin. The intention in said U. S. Patent 2,494,295, of course, is to obtain ultimately a suitable resinous product having the characteristics of a comparatively insoluble resin. The intent in the present instance in a comparable example would be to use a sulfonamide (not a sulfonamide resin) and obtain a material which does not have the characteristics of an ordinary varnish resin or the like, i. e., is permanently soluble, and stays soluble generally as a liquid of ordinary viscosity, or as a thick viscous liquid and may be a thermoplastic solid, and additionally even may be water-soluble.

To illustrate the products which represent the subject matter of the present invention reference will be made to a reaction involving of the oxyalkylating agent, i. e., the compound having two oxirane rings and a phenol aldehyde resin. Proceeding with the example previously described it is obvious the reaction ratio of two moles of the resin to one mole of the oxyalkylating agent gives a product which may be indicated as follows:

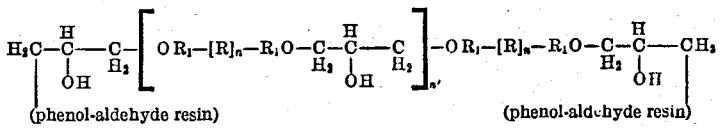

(phenol-aldehyde resin)            (phenol-aldehyde resin)

in which the various characters have their prior significance. However, molal ratios may be varied as noted subsequently.

Such final product in turn also must be soluble but solubility is not limited to an organic solvent but may include water. For instance, the products freed from any solvent can be shaken with five to twenty times their weight of distilled water at ordinary temperature and are at least self-dispersing, and in many instances water-soluble, in fact, colloidally soluble.

Similarly, derivatives can be obtained by use of a product having both a nitrogen group and a 1,2-epoxy group, such as 3-dialkylaminoepoxypropane. See U. S. Patent No. 2,520,093, dated August 22, 1950, to Gross.

As far as the use of the herein described products goes for the purpose of resolving petroleum emulsions of the water-in-oil type, and also for that matter for numerous other purposes where surface-active materials are effective, and particularly for those uses specified elsewhere herein, we prefer to employ oxyalkylated derivatives, which are obtained by the use of mono-epoxides, that is, ethylene oxide, propylene oxide, butylene oxide, glycide or methyl glycide or combinations or mixtures thereof, in such manner that the derivatives so obtained have sufficient hydrophile character to meet at least the test set forth in U. S. Patent No. 2,499,368, dated March 7, 1950, to De Groote et al. In said patent such test for emulsification using a water-insoluble solvent, generally xylene, is described as an index of surface activity.

In the present instance the various oxyalkylated derivatives obtained particularly by use of ethylene oxide, propylene oxide, etc., may not necessarily be xylene-soluble although they are xylene-soluble in a large number of instances. If such compounds are not xylene-soluble the obvious chemical equivalent, or equivalent chemical test, can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test obviously is the same for the reason that there will be two phases on vigorous shaking and surface activity makes its presence manifest. It is understood the reference in the hereto appended claims as to the use of xylene in the emulsification test includes such obvious variant.

Another peculiarity of the compounds herein described is that they may pass into a comparatively high molecular weight range and be effective for various purposes, not only for the resolution of petroleum emulsions but also for other industrial uses described in detail elsewhere. This characteristic may be related to the fact that the initial resin molecule, obtained in turn from two resin molecules combined by means of a polyepoxide as described, results in a fairly large molecule. We have found we can obtain compounds effective for purposes where surface-active materials are employed, whether it be the resolution of petroleum emulsions or other uses, in which one part of the derivative obtained by the polyepoxide reaction is combined with 50 parts by weight of the alkylene oxide, i. e., the intermediate polyepoxide derivative may contribute somewhat less than 2% of the total oxyalkylated molecule. The word "oxyalkylated" is employed in this sense for purpose of convenience in referring to the mono-epoxide derivatives only.

For purpose of convenience what is said hereinafter will be divided into eight parts with Part 3, in turn, being divided into three subdivisions.

Part 1 is concerned with our preference in regard to the polyepoxide and particularly the diepoxide reactant;

Part 2 is concerned with certain theoretical aspects of diepoxide preparation;

Part 3, Subdivision A, is concerned with the preparation of monomeric diepoxides, including Table I;

Part 3, Subdivision B, is concerned with the preparation of low molal polymeric epoxides or mixtures containing low molal polymeric epoxides as well as the monomer and includes Table II;

Part 3, Subdivision C, is concerned with miscellaneous phenolic reactants suitable for diepoxide preparation;

Part 4 is concerned with suitable phenol-aldehyde resins to be employed for reaction with the epoxides;

Part 5 is concerned with the reactions involving the two preceding types of materials and examples obtained by such reaction. Generally speaking, this involves nothing more than a reaction between 2 moles of a previously prepared phenol-aldehyde resin as described, and one mole of a polyepoxide so as to yield a new and larger resin molecule.

Part 6 is concerned with the oxyalkylation of the previously described resultant or cogeneric mixture which, for sake of simplicity, may be referred to as a polyepoxide-derived dimer although such language is merely an approximation of its characteristics. Oxyalkylation refers to use of the previously indicated mono-epoxides.

Part 7 is concerned with the resolution of petroleum emulsions of the water-in-oil type by means of the previously described chemical compounds or reaction products; and Part 8 is concerned with uses for the products herein described, either as such or after modification, including uses in applications other than those involving resolution of petroleum emulsions of the water-in-oil type.

PART 1

As will be pointed out subsequently, the preparation of polyepoxides may include the formation of a small amount of material having more than two epoxide groups per molecule. If such compounds are formed they are perfectly suitable except to the extent they may tend to produce ultimate reaction products which are not solvent-soluble liquids or low-melting solids. Indeed, they tend to form thermosetting resins or insoluble materials. Thus, the specific objective by and large is to produce diepoxides as free as possible from any monoepoxides and as free as possible from polyepoxides in which there are more than two epoxide groups per molecule. Thus, for practical purposes what is said hereinafter is largely limited to polyepoxides in the form of diepoxides.

As has been pointed out previously one of the reactants employed is a diepoxide reactant. It is generally obtained from phenol (hydroxybenzene) or substituted phenol. The ordinary or conventional manufacture of the epoxides usually results in the formation of a cogeneric mixture as explained subsequently. Preparation of the monomer or separation of the monomer from the remaining mass of the co-generic mixture is usually expensive. If monomers were available commercially at a low cost, or if they could be prepared without added expense for separation, our preference would be to use the monomer. Certain monomers have been prepared and described in the literature and will be referred to subsequently. However, from a practical standpoint one must weigh the advantage, if any, that the monomer has over other low molal polymers from a cost standpoint; thus we have found that one might as well attempt to prepare a monomer and fully recognize that there may be present, and probably invariably are present, other low molal polymers in comparatively small amounts. Thus, the materials which are most apt to be used for practical reasons are either monomers with some small amounts of polymers present or mixtures which have a substantial amount of polymers present. Indeed, the mixture can be prepared free from monomers and still be satisfactory. Briefly, then, our preference is to use the monomer or the monomer with the minimum amount of higher polymers.

It has been pointed out previously that the phenolic nuclei in the epoxide reactant may be directly united, or united through a variety of divalent radicals. Actually, it is our preference to use those which are commercially available and for most practical purposes it means instances where the phenolic nuclei are either united directly without any intervening linking radical, or else united by a ketone residue or formaldehyde residue. The commercial bis-phenols available now in the open market illustrate one class. The diphenyl derivatives illustrate a second class, and the materials obtained by reacting substituted monofunctional phenols with an aldehyde illustrate the third class. All the various known classes may be used but our preference rests with these classes due to their availability and ease of preparation, and also due to the fact that the cost is lower than in other examples.

Although the diepoxide reactants can be produced in more than one way, as pointed out elsewhere, our preference is to produce them by means of the epichlorohydrin reaction referred to in detail subsequently.

One epoxide which can be purchased in the open market and contains only a modest amount of polymers corresponds to the derivative of bis-phenol A. It can be used as such, or the monomer can be separated by an added step which involves additional expense. This compound of the following structure is preferred as the epoxide reactant and will be used for illustration repeatedly with the full understanding that any of the other epoxides described are equally satisfactory, or that the higher polymers are satisfactory, or that mixtures of the monomer and higher polymers are satisfactory. The formula for this compound is

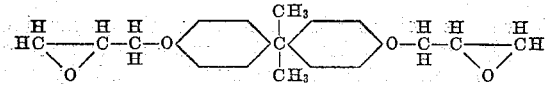

Reference has just been made to bis-phenol A and a suitable epoxide derived therefrom. Bis-phenol A is dihydroxy-diphenyl-dimethylmethane, with the 4,4' isomers predominating and with lesser quantities of the 2,2' and 4,2' isomers being present. It is immaterial which one of these isomers is used and the commercially available mixture is entirely satisfactory.

Attention is again directed to the fact that in the instant part, to wit, Part 1, and in succeeding parts, the text is concerned almost entirely with epoxides in which there is no bridging radical or the bridging radical is derived from an aldehyde or a ketone. It would be immaterial if the divalent linking radical would be derived from the other groups illustrated for the reason that nothing more than mere substitution of one compound for the other would be required. Thus, what is said hereinafter, although directed to one class or a few classes, applies with equal force and effect to the other classes of epoxide reactants.

If sulfur-containing compounds are prepared they should be freed from impurities with considerable care for the reason that any time that a low-molal sulfur-containing compound can react with epichlorohydrin there may be formed a by-product in which the chlorine happened to be particularly reactive and may represent a product, or a mixture of products, which would be unusually toxic, even though in comparatively small concentration.

PART 2

The polyepoxides and particularly the diepoxides can be derived by more than one method as, for example, the use of epichlorohydrin or glycerol dichlorohydrin. If a product such as bis-phenol A is employed the ultimate compound in monomeric form employed as a reactant in the present invention has the following structure:

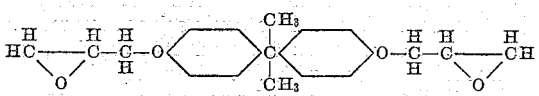

Treatment with epichlorohydrin, for example, does not yield this product initially but there is an intermediate produced which can be indicated by the following structure:

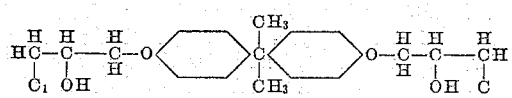

Treatment with alkali, of course, forms the epoxy ring. A number of problems are involved in attempting to produce this compound free from cogeneric materials of related composition. The difficulty stems from a number of sources and a few of the more important ones are as follows:

(1) The closing of the epoxy ring involves the use of caustic soda or the like which, in turn, is an effective catalyst in causing the ring to open in an oxyalkylation reaction.

Actually, what may happen for any one of a number of reasons is that one obtains a product in which there is only one epoxide ring and there may, as a matter of fact, be more than one hydroxyl radical as illustrated by the following compounds:

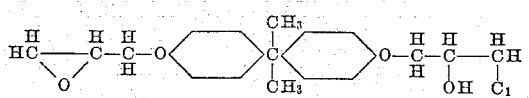

or

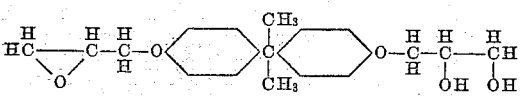

(2) Even if one starts with the reactants in the preferred ratio, to wit, two parts of epichlorohydrin to one part of bisphenol A, they do not necessarily so react and as a result one may obtain products in which more than two epichlorohydrin residues become attached to a single bis-phenol A nucleus by virtue of the reactive hydroxyls present which enter into oxyalkylation reactions rather than ring closure reactions.

(3) As is well known, ethylene oxide in the presence of alkali, and for that matter in the complete absence of water, forms cyclic polymers. Indeed, ethylene oxide can produce a solid polymer. This same reaction can, and at times apparently does, take place in connection with compounds having one, or in the present instance, two substituted oxirane rings, i. e., substituted 1,2 epoxy rings. Thus, in many ways it is easier to produce a polymer, particularly a mixture of the monomer, dimer and trimer, than it is to produce the monomer alone.

(4) As has been pointed out previously, monoepoxides may be present and, indeed, are almost invariably and inevitably present when one attempts to produce polyepoxides, and particularly diepoxides. The reason is the one which has been indicated previously, together with the fact that in the ordinary course of reaction a di-epoxide, such as

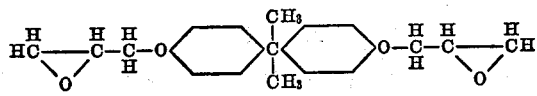

may react with a mole of bis-phenol A to give a mono-epoxy structure. Indeed, in the subsequent text immediately following reference is made to the dimers, trimers and tetramers in which two epoxide groups are present. Needless to say, compounds can be formed which correspond in every respect except that one terminal epoxide group is absent and in its place is a group having one chlorine atom and one hydroxyl group, or else two hydroxyl groups, or an unreacted phenolic ring.

(5) Some reference has been made to the presence of a chlorine atom and although all effort is directed towards the elimination of any chlorine-containing molecule yet it is apparent that this is often an ideal approach rather than a practical possibility. Indeed, the same sort of reactants are sometimes employed to obtain products in which intentionally there is both an epoxide group and a chlorine atom present. See U. S. Patent No. 2,581,464, dated January 8, 1952, to Zech.

What has been said in regard to the theoretical aspect is, of course, closely related to the actual method of preparation which is discussed in greater detail in Part 3, particularly subdivisions A and B. There can be no clear line between the theoretical aspect and actual preparative steps. However, in order to summarize or illustrate what has been said in Part 1, immediately preceding reference will be made to a typical example which already has been employed for purpose of illustration. The particular example is

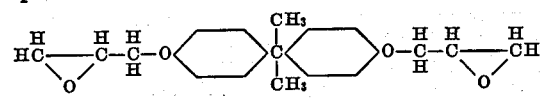

It is obvious that two moles of such material combine readily with one mole of bis-phenol A,

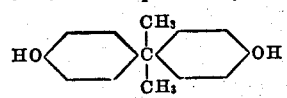

to produce the product which is one step further along, at least, towards polymerization. In other words, one prior example shows the reaction product obtained from one mole of the bisphenol A and two moles of epichlorohydrin. This product in turn would represent three moles of bisphenol A and four moles of epichlorohydrin.

For purpose of brevity, without going any further, the next formula is in essence one which, perhaps in an idealized way, establishes the composition of resinous products available under the name of Epon Resins as now sold in the open market. See, also, chemical pamphlet entitled "Epon Surface-Coating Resins," Shell Chemical Corporation, New York City. The word "Epon" is a registered trademark of the Shell Chemical Corporation.

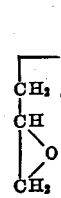
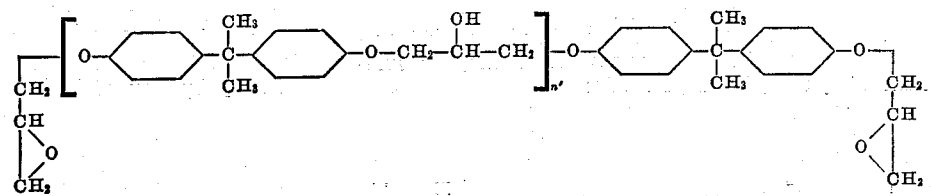

For the purpose of the instant invention, $n'$ may represent a number including zero, and at the most a low number such as 1, 2 or 3. This limitation does not exist in actual efforts to obtain resins as differentiated from the herein described soluble materials. It is quite probable that in the resinous products as marketed for coating use the value of $n'$ is usually substantially higher. Note again what has been said previously that any formula is, at best, an over-simplification, or at the most represents perhaps only the more important or principal constituent or constituents. These materials may vary from simple non-resinous to complex resinous epoxides which are polyether derivatives of polyhydric phenols containing an average of more than one epoxide group per molecule and free from functional groups other than epoxide and hydroxyl groups.

Referring now to what has been said previously, to wit, compounds having both an epoxy ring or the equivalent and also a hydroxyl group, one need go no further than to consider the reaction product of

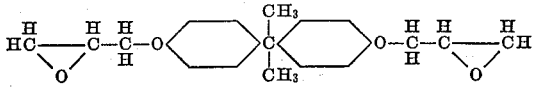

and bisphenol A in a mole-for-mole ratio, since the initial reactant would yield a product having an unreacted epoxy ring and two reactive hydroxyl radicals. Referring again to a previous formula, consider an example where two moles of bisphenol A have been reacted with 3 moles of epichlorohydrin. The simplest compound formed would be thus:

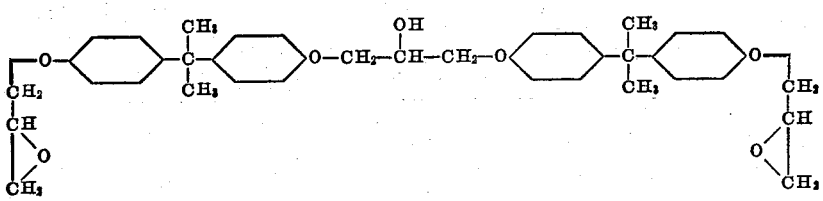
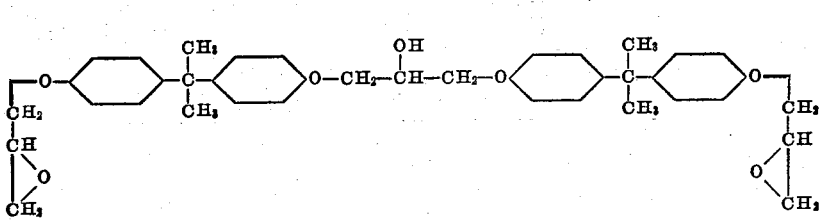

Such a compound is comparable to other compounds having both the hydroxyl and epoxy ring such as 9,10-epoxy octadecanol. The ease with which this type of compound polymerizes is pointed out by U. S. Patent No. 2,457,329, dated December 28, 1948, to Swern et al.

The same difficulty which involves the tendency to polymerize on the part of compounds having a reactive ring and a hydroxyl radical may be illustrated by compounds where, instead of the oxirane ring (1,2-epoxy ring) there is present a 1,3-epoxy ring. Such compounds are derivatives of trimethylene oxide rather than ethylene oxide. See U. S. Patent Nos. 2,462,047 and 2,642,048, both dated February 15, 1949, to Wyler.

At the expense of repetition of what appeared previously it may be well to recall that these materials may vary from simple soluble non-resinous to complex non-soluble resinous epoxides which are polyether derivatives of polyhydric phenols containing an average of more than one epoxide group per molecule and free from functional groups other than epoxide and hydroxyl groups. The former are here included, but the latter, i. e., highly resinous or insoluble types, are not.

In summary then in light of what has been said, compounds suitable for reaction with resins may be summarized by the following formula:

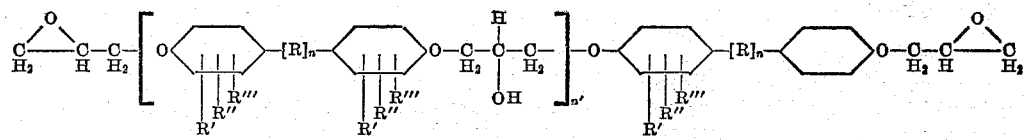

or for greater simplicity the formula could be restated thus:

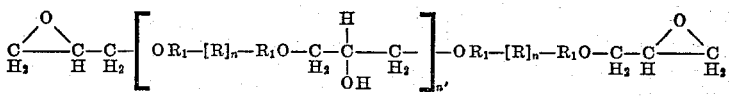

in which the various characters have their prior significance and in which $R_1O$ is the divalent radical obtained by the elimination of a hydroxyl hydrogen atom and a nuclear hydrogen atom from the phenol

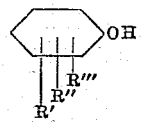

in which R', R'', and R''' represent a member of the class consisting of hydrogen and hydrocarbon substituents of the aromatic nucleus, said substituent member having not over 18 carbon atoms; $n$ represents an integer selected from the class of zero and 1, and $n'$ represents a whole number not greater than 3.

PART 3

Subdivision A

The preparations of the diepoxy derivatives of the diphenols, which are sometimes referred to as diglycidyl ethers, have been described in a number of patents. For convenience, reference will be made to two only, to wit, aforementioned U. S. Patent 2,506,486, and aforementioned U. S. Patent No. 2,530,353.

Purely by way of illustration, the following diepoxides, or diglycidyl ethers as they are sometimes termed, are included for purpose of illustration. These particular compounds are described in the two patents just mentioned.

TABLE I

| Example number | Diphenol | Diglycidyl ether | Patent reference |
|---|---|---|---|
| 1A | $CH_2(C_6H_4OH)_2$ | Di(epoxypropoxyphenyl)methane | 2,506,486 |
| 2A | $CH_3CH(C_6H_4OH)_2$ | Di(epoxypropoxyphenyl)methylmethane | 2,506,486 |
| 3A | $(CH_3)_2C(C_6H_4OH)_2$ | Di(epoxypropoxyphenyl)dimethylmethane | 2,506,486 |
| 4A | $C_2H_5C(CH_3)(C_6H_4OH)_2$ | Di(epoxypropoxyphenyl)ethylmethylmethane | 2,506,486 |
| 5A | $(C_2H_5)_2C(C_6H_4OH)_2$ | Di(epoxypropoxyphenyl)diethylmethane | 2,506,486 |
| 6A | $CH_3C(C_3H_7)(C_6H_4OH)_2$ | Di(epoxypropoxyphenyl)methylpropylmethane | 2,506,486 |
| 7A | $CH_3C(C_6H_5)(C_6H_4OH)_2$ | Di(epoxypropoxyphenyl)methylphenylmethane | 2,506,486 |
| 8A | $C_2H_5C(C_6H_5)(C_6H_4OH)_2$ | Di(epoxypropoxyphenyl)ethylphenylmethane | 2,506,486 |
| 9A | $C_3H_7C(C_6H_5)(C_6H_4OH)_2$ | Di(epoxypropoxyphenyl)propylphenylmethane | 2,506,486 |
| 10A | $C_4H_9C(C_6H_5)(C_6H_4OH)_2$ | Di(epoxypropoxyphenyl)butylphenylmethane | 2,506,486 |
| 11A | $(CH_3C_6H_4)CH(C_6H_4OH)_2$ | Di(epoxypropoxyphenyl)tolylmethane | 2,506,486 |
| 12A | $(CH_3C_6H_4)C(CH_3)(C_6H_4OH)_2$ | Di(epoxypropoxyphenyl)tolylmethylmethane | 2,506,486 |
| 13A | Dihydroxy diphenyl | 4,4'-bis(2,3-epoxypropoxy)diphenyl | 2,530,353 |
| 14A | $(CH_3)C(C_4H_9.C_6H_3OH)_2$ | 2,2-bis(4-(2,3-epoxypropoxy)2-tertiarybutyl phenyl)propane | 2,530,353 |

Subdivision B

As to the preparation of low-molal polymeric epoxides or mixtures reference is made to numerous patents and particularly the aforementioned U. S. Patents Nos. 2,575,558 and 2,582,985, in particular, the preparation of Example 1 of said Patent 2,582,985.

To the extent that one can propose a formula, even though it is an over-simplified idealization, it appears extremely desirable to includes specific reference to aforementioned U. S. Patent No. 2,575,558. The reason is that this patent includes the same formula which has been referred to previously in Part 2, which is concerned with the theoretical aspects of diepoxide preparation. Furthermore, this formula, or its counterpart, appears in the hereto appended claims.

The following examples can be specified by reference to the formula in Patent 2,575,558 provided one still bears in mind it is in essence an over-simplification.

TABLE II

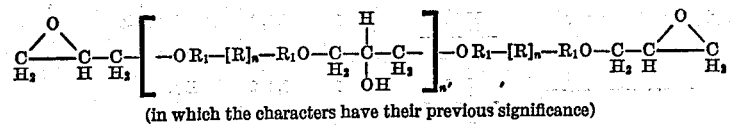

(in which the characters have their previous significance)

| Example number | —R₁O— from HR₁OH | —R— | n | n' | Remarks |
|---|---|---|---|---|---|
| B1 | Hydroxy benzene | CH₃<br>−C−<br>CH₃ | 1 | 0, 1, 2 | Phenol known as bis-phenol A. Low polymeric mixture about ⅔ or more where n'=0, remainder largely where n'=1, some where n'=2. |
| B2 | do | CH₃<br>−C−<br>CH₂<br>CH₃ | 1 | 0, 1, 2 | Phenol known as bis-phenol B. See note regarding B1 above. |
| B3 | Orthobutylphenol | CH₃<br>−C−<br>CH₃ | 1 | 0, 1, 2 | Even though n' is preferably 0, yet the usual reaction product might well contain materials where n' is 1, or to a lesser degree 2. |
| B4 | Orthoamylphenol | CH₃<br>−C−<br>CH₃ | 1 | 0, 1, 2 | Do. |
| B5 | Orthooctylphenol | CH₃<br>−C−<br>CH₃ | 1 | 0, 1, 2 | Do. |
| B6 | Orthononylphenol | CH₃<br>−C−<br>CH₃ | 1 | 0, 1, 2 | Do. |
| B7 | Orthododecylphenol | CH₃<br>−C−<br>CH₃ | 1 | 0, 1, 2 | Do. |
| B8 | Metacresol | CH₃<br>−C−<br>CH₃ | 1 | 0, 1, 2 | See prior note. This phenol used as initial material is known as bis-phenol C. For other suitable bis-phenols see U. S. Patent 2,564,191. |
| B9 | do | CH₃<br>−C−<br>CH₂<br>CH₃ | 1 | 0, 1, 2 | See prior note. |
| B10 | Dibutyl (ortho-para) phenol | H<br>−C−<br>H | 1 | 0, 1, 2 | Do. |
| B11 | Diamyl (ortho-para) phenol | H<br>−C−<br>H | 1 | 0, 1, 2 | Do. |
| B12 | Dioctyl (ortho-para) phenol | H<br>−C−<br>H | 1 | 0, 1, 2 | Do. |
| B13 | Dinonyl (ortho-para) phenol | H<br>−C−<br>H | 1 | 0, 1, 2 | Do. |
| B14 | Diamyl (ortho-para) phenol | H<br>−C−<br>CH₃ | 1 | 0, 1, 2 | Do. |
| B15 | do | H<br>−C−<br>C₂H₅ | 1 | 0, 1, 2 | Do. |
| B16 | Hydroxy benzene | O<br>−S−<br>O | 1 | 0, 1, 2 | Do. |
| B17 | Diamyl phenol (ortho-para) | −S−S− | 1 | 0, 1, 2 | Do. |
| B18 | do | −S− | 1 | 0, 1, 2 | Do. |

TABLE II—Continued

| Example number | —R₁O— from HR₁OH | —R— | $n$ | $n'$ | Remarks |
|---|---|---|---|---|---|
| B19 | Dibutyl phenol (ortho-para) | $-\underset{H}{\underset{|}{C}}-\underset{H}{\underset{|}{C}}-$ | 1 | 0,1,2 | See prior note. |
| B20 | ....do.... | $-\underset{H}{\underset{|}{C}}-\underset{H}{\underset{|}{C}}-$ | 1 | 0,1,2 | Do. |
| B21 | Dinonylphenol (ortho-para) | $-\underset{H}{\underset{|}{C}}-\underset{H}{\underset{|}{C}}-$ | 1 | 0,1,2 | Do. |
| B22 | Hydroxy benzene | $-\underset{\|}{\overset{O}{C}}-$ | 1 | 0,1,2 | Do. |
| B23 | ....do.... | None | 0 | 0,1,2 | Do. |
| B24 | Ortho-isopropyl phenol | $-\underset{CH_3}{\underset{|}{\overset{CH_3}{\overset{|}{C}}}}-$ | 1 | 0,1,2 | See prior note. (As to preparation of 4,4'-isopropylidene bis-(2-isopropylphenol) see U. S. Patent No. 2,482,748, dated Sept. 27, 1949, to Dietzler.) |
| B25 | Para-octyl phenol | $-CH_2-S-CH_2-$ | 1 | 0,1,2 | See prior note. (As to preparation of the phenol sulfide see U. S. Patent No. 2,488,134, dated Nov. 15, 1949, to Mikeska et al.) |
| B26 | Hydroxybenzene | $-\underset{\underset{\underset{C_2H_5}{|}}{\overset{O}{|}}}{\underset{CH_2}{\underset{|}{\overset{CH_3}{\overset{|}{C}}}}}-$ | 1 | 0,1,2 | See prior note. (As to preparation of the phenol sulfide see U. S. Patent No. 2,526,545.) |

Subdivision C

The prior examples have been limited largely to those in which there is no divalent linking radical, as in the case of diphenyl compounds, or where the linking radical is derived from a ketone or aldehyde, particularly a ketone. Needless to say, the same procedure is employed in converting diphenyl into a diglycidyl ether regardless of the nature of the bond between the two phenolic nuclei. For purpose of illustration attention is directed to numerous other diphenols which can be readily converted to a suitable polyepoxide, and particularly diepoxide, reactant.

As previously pointed out the initial phenol may be substituted, and the substituent group in turn may be a cyclic group such as the phenyl group or cyclohexyl group as in the instance of cyclohexylphenol or phenylphenol. Such substituents are usually in the ortho position and may be illustrated by a phenol of the following composition:

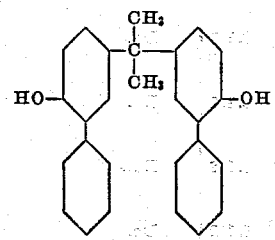

Similar phenols which are monofunctional, for instance, paraphenyl phenol or paracyclohexyl phenol with an additional substituent in the ortho position, may be employed in reactions previously referred to, for instance, with formaldehyde or sulfur chlorides to give comparable phenolic compounds having 2 hydroxyls and suitable for subsequent reaction with epichlorohydrin, etc.

Other samples include:

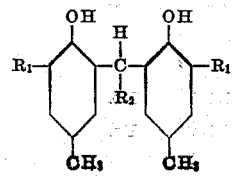

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups, and wherein said alkyl group contains at least 3 carbon atoms. See U. S. Patent No. 2,515,907.

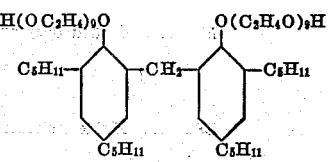

in which the —$C_5H_{11}$ groups are secondary amyl groups. See U. S. Patent No. 2,504,064.

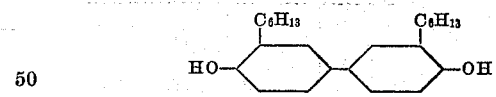

See U. S. Patent No. 2,285,563.

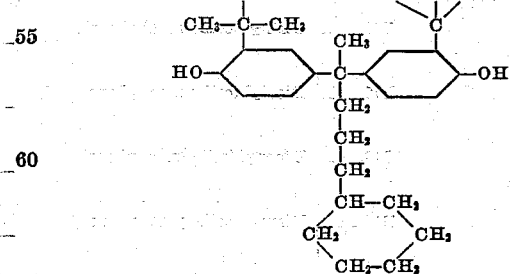

See U. S. Patent No. 2,503,196.

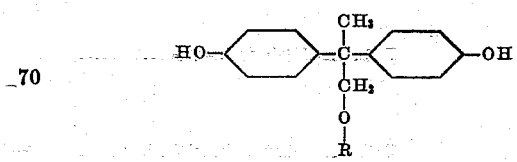

wherein R is a member of the group consisting of alkyl, and alkoxy-alkyl radicals containing from 1 to 5 carbon atoms, inclusive, and aryl and chloraryl radicals of the benzene series. See U. S. Patent No. 2,526,545.

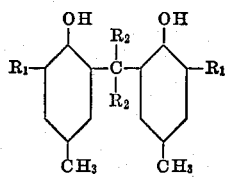

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups. See U. S. Patent No. 2,515,906.

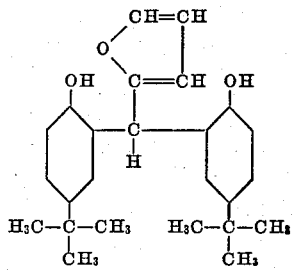

See U. S. Patent No. 2,515,908.

As to sulfides, the following compound is of interest:

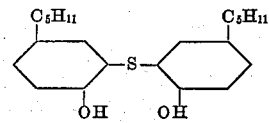

See U. S. Patent No. 2,331,448.

As to descriptions of various suitable phenol sulfides, reference is made to the following patents: U. S. Patents Nos. 2,246,321, 2,207,719, 2,174,248, 2,139,766, 2,244,021, and 2,195,539.

As to sulfones, see U. S. Patent No. 2,122,958.

As to suitable compounds obtained by the use of formaldehyde or some other aldehyde, particularly compounds such as

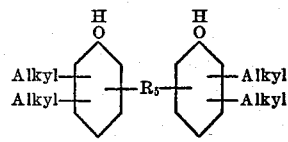

in which $R_5$ is a methylene radical, or a substituted methylene radical which represents the residue of an aldehyde and is preferably the unsubstituted methylene radical derived from formaldehyde. See U. S. Patent No. 2,430,002.

See also U. S. Patent No. 2,581,919 which describes di(dialkyl cresol) sulfides which include the monosulfides, the disulfides, and the polysulfides. The following formula represents the various dicresol sulfides of this invention:

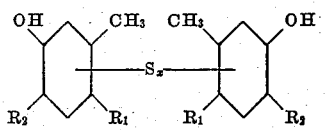

in which $R_1$ and $R_2$ are alkyl groups, the sum of whose carbon atoms equals 6 to about 20, and $R_1$ and $R_2$ each preferably contain 3 to about 10 carbon atoms, and $x$ is 1 to 4. The term "sulfides" as used in this text, therefore, includes monosulfide, disulfide, and polysulfide.

PART 4

This part is concerned with the preparation of phenol-aldehyde resins of the kind described in detail in U. S. Patent No. 2,499,370, dated March 7, 1950, to De Groote and Keiser, with the following qualifications; said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, commercially available. Similarly, resins can be prepared from hexadecylphenol or octadecylphenol. This feature will be referred to subsequently.

In addition to U. S. Patent No. 2,499,370, reference is made also to the following U. S. Patents: Nos. 2,499,365, 2,499,366 and 2,499,367, all dated March 7, 1950, to De Groote and Keiser. These patents, along with the other two previously mentioned patents, described phenolic resins of the kind herein employed as initial materials.

For practical purposes, the resins having 4 to 12 carbon atoms are most satisfactory, with the additional $C_{14}$ carbon atom also being very satisfactory. The increased cost of the $C_{16}$ and $C_{18}$ carbon atom phenol renders these raw materials of less importance, at least at the present time.

Patent 2,499,370 describes in detail methods of preparing resins useful as intermediates for preparing the products of the present application, and reference is made to that patent for such detailed description and to Examples 1a through 103a of that patent for examples of suitable resins.

As previously noted, the hydrocarbon substituent in the phenol may have as many as 18 carbon atoms, as illustrated by tetradecylphenol, hexadecylphenol and octadecylphenol; reference in each instance being to the difunctional phenol, such as the ortho- or para-substituted phenol or a mixture of the same. Such resins are described also in issued patents, for instance, U. S. Patent No. 2,499,365, dated March 7, 1950, to De Groote and Keiser, such as Example 71a.

It is sometimes desirable to present the resins herein employed in an over-simplified form which has appeared from time to time in the literature, and particularly in the patent literature, for instance, it has been stated that the composition is approximated in an idealized form by the formula

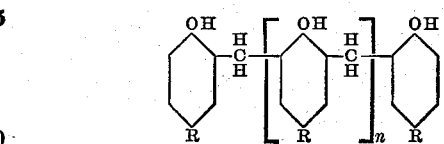

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 14 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

In the above formula the aldehyde employed in the resin manufacture is formaldehyde. Actually some other aldehyde such as acetaldehyde, propionaldehyde, or butyraldehyde may be used. The resin unit can be exemplified thus:

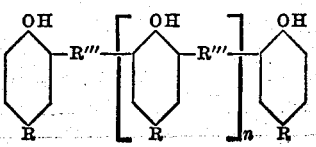

in which R''' is the divalent radical obtained from the particular aldehyde employed to form the resin.

As previously stated the preparation of resins, the kind herein employed as reactants, is well known. See U. S. Patent No. 2,499,368, dated March 7, 1950, to De Groote and Keiser. Resins can be made using an acid catalyst or basic catalyst or a catalyst showing neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins we found no reason for using other than those which are lowest in price and most readily available commercially. For purpose of convenience suitable resins are characterized in the following table:

TABLE III

| Example number | R | Position of R | R''' derived from— | $n$ | Mol. wt. of resin molecule (based on $n+2$) |
|---|---|---|---|---|---|
| C1 | Phenyl | Para | Formaldehyde | 3.5 | 992.5 |
| C2 | Tertiary butyl | do | do | 3.5 | 882.5 |
| C3 | Secondary butyl | Ortho | do | 3.5 | 882.5 |
| C4 | Cyclohexyl | Para | do | 3.5 | 1,025.5 |
| C5 | Tertiary amyl | do | do | 3.5 | 959.5 |
| C6 | Mixed secondary and tertiary amyl | Ortho | do | 3.5 | 805.5 |
| C7 | Propyl | Para | do | 3.5 | 805.5 |
| C8 | Tertiary hexyl | do | do | 3.5 | 1,036.5 |
| C9 | Octyl | do | do | 3.5 | 1,190.5 |
| C10 | Nonyl | do | do | 3.5 | 1,267.5 |
| C11 | Decyl | do | do | 3.5 | 1,344.5 |
| C12 | Dodecyl | do | do | 3.5 | 1,498.5 |
| C13 | Tertiary butyl | do | Acetaldehyde | 3.5 | 945.5 |
| C14 | Tertiary amyl | do | do | 3.5 | 1,022.5 |
| C15 | Nonyl | do | do | 3.5 | 1,330.5 |
| C16 | Tertiary butyl | do | Butyraldehyde | 3.5 | 1,071.5 |
| C17 | Tertiary amyl | do | do | 3.5 | 1,148.5 |
| C18 | Nonyl | do | do | 3.5 | 1,456.5 |
| C19 | Tertiary butyl | do | Propionaldehyde | 3.5 | 1,008.5 |
| C20 | Tertiary amyl | do | do | 3.5 | 1,085.5 |
| C21 | Nonyl | do | do | 3.5 | 1,393.5 |
| C22 | Tertiary butyl | do | Formaldehyde | 4.2 | 996.6 |
| C23 | Tertiary amyl | do | do | 4.2 | 1,083.4 |
| C24 | Nonyl | do | do | 4.2 | 1,430.6 |
| C25 | Tertiary butyl | do | do | 4.8 | 1,094.4 |
| C26 | Tertiary amyl | do | do | 4.8 | 1,189.6 |
| C27 | Nonyl | do | do | 4.8 | 1,570.4 |
| C28 | Tertiary amyl | do | do | 1.5 | 604.0 |
| C29 | Cyclohexyl | do | do | 1.5 | 646.0 |
| C30 | Hexyl | do | do | 1.5 | 653.0 |
| C31 | do | do | Acetaldehyde | 1.5 | 688.0 |
| C32 | Octyl | do | do | 1.5 | 786.0 |
| C33 | Nonyl | do | do | 1.5 | 835.0 |
| C34 | Octyl | do | Butyraldehyde | 2.0 | 986.0 |
| C35 | Nonyl | do | do | 2.0 | 1,028.0 |
| C36 | Amyl | do | do | 2.0 | 860.0 |
| C37 | Butyl | do | Formaldehyde | 2.0 | 636.0 |
| C38 | Amyl | do | do | 2.0 | 692.0 |
| C39 | Hexyl | do | do | 2.0 | 748.0 |
| C40 | Cyclohexyl | do | do | 2.0 | 740.0 |

PART 5

As previously stated, the intermediate reactions involve two moles of a phenol-aldehyde resin of the kind previously described, and one mole of a diglycidyl ether as described. The reaction is essentially an oxyalkylation but, for sake of convenience is differentiated from the subsequent oxyalkylation procedure which involves a mono-epoxide only. Since the polyepoxide is nonvolatile as compared, for example, to ethylene oxide, the reaction is comparatively simple. On the other hand, purely as a matter of convenience, one generally would conduct both classes of reactions in the same equipment. In other words, the two moles of phenol-aldehyde resin would be reacted with a polyepoxide and then subsequently with a mono-epoxide. In any event, the polyepoxide reaction can be conducted in an ordinary reaction vessel, such as the usual glass laboratory equipment. This is particularly true of the kind used for resin manufacture as described in a number of patents, as for example, U. S. Patent No. 2,499,365. One can use a variety of catalysts in connection with the polyepoxide of the same class employed with mono-epoxide. In fact, the reaction will go at an extremely slow rate without any catalyst at all. The usual catalysts include alkaline materials such as caustic soda, caustic potash, sodium methylate, etc. Other catalysts may be acidic in nature and are of the kind characterized by iron and tin chlorides. Furthermore, insoluble catalysts such as clays or specially prepared mineral catalysts have been used. For practical purposes it is best to use a catalyst which can remain in the reaction mass and will continue to serve as a catalyst in connection with the oxyalkylation employing the mono-epoxide. For this reason we have preferred to use a small amount of finely divided caustic soda or sodium methylate as a catalyst. The amount generally employed is 1%, 2%, or 3% of these alkaline catalysts.

Actually, the reactions of polyepoxides with various resin materials have been thoroughly described in the literature and the procedure is, for all purposes, the same as with glycide which is described in detail in the next succeeding part, to wit, Part 6.

The use of an excessive amount of catalyst may produce side reactions as in the case of glycide. For the sake of simplicity the procedure will be illustrated by examples but particular reference is made again to the further discussion of oxyalkylation reactions and procedures in Part 6.

It goes without saying that the reaction can take place in an inert solvent, i. e., one that is not oxyalkylation-susceptible. Generally speaking, this is most conveniently an aromatic solvent such as xylene or a higher boiling coal tar solvent, or else a similar high boiling aromatic solvent obtained from petroleum. One can employ an oxygenated solvent such as the diethylether of ethylene glycol, or the diethylether of propylene glycol, or similar ethers, either alone or in combination with a hydrocarbon solvent. The solvent so selected should be one which, of course, is suitable in the oxyalkylation step involving the mono-epoxides described subsequently. The solvent selected may depend on the ability to remove it by subsequent distillation if required.

*Example D1*

The phenol-formaldehyde resin employed was the one previously identified as C38, having a molecular weight of approximately 700; the amount employed was 1408 grams. The resin was finely powdered and 1,000 grams of xylene added. The mixture was heated to 90° C. and stirred until solution was complete. 25 grams of sodium methylate were then added and stirring continued until complete solution or distribution was obtained. The mixture was heated to 100° C. and left at this temperature while 340 grams of the diepoxide (previously identified as 3a, dissolved in 500 grams of xylene) were added dropwise. Just before the addition of the diepoxide solution the temperature was raised to 105° C. The time required to add the diepoxide was approximately 1¾ hours. The temperature rose during this period of time to about 126° C. The product was then allowed to reflux at a temperature of 128° C. for 2 hours. During this period there was a modest loss of xylene and the temperature rose slightly to 130° C. Heating was then allowed to proceed for another 9 hours and part of the xylene removed by use of a conventional phase-separating trap, so at the end of the 9-hour period the temperature was approximately 141° C. Refluxing was then continued further for another 7-hour period, with the removal of a small amount of xylene by the use of the phase-separating trap. The temperature at the end of this time reached about 145° C. At the end of this period of time there was a slight residue equivalent to approximately 10 to 14 cc., in the bottom of the reaction flask or pot, and a slight amount of xylene was added—about 100 grams—in order to have the final reaction mass represent approximately one-half reaction mass and one-half solvent. Subsequent tests in an evaporating dish showed there was approximately 49% reaction mass and 51% solvent.

The procedure employed, of course, is simple in light of what has been said previously and also in light of what is said in the next section. Various examples obtained in substantially the same manner are enumerated and described in the following tables:

TABLE VI

| Ex. No. | Resin | Probable mol. wt. of reaction product | Amt. of product, grs. | Amt. of solvent, grs. | Probable number of hydroxyls per molecule |
|---|---|---|---|---|---|
| D1 | C38 | 1,748 | 3,563 | 1,815 | 8 |
| D2 | C1 | 2,325 | 4,650 | 2,325 | 11 |
| D3 | C2 | 2,105 | 4,305 | 2,200 | 11 |
| D4 | C4 | 2,391 | 4,782 | 2,391 | 11 |
| D5 | C9 | 2,721 | 5,442 | 2,721 | 11 |
| D6 | C10 | 2,875 | 5,750 | 2,875 | 11 |
| D7 | C13 | 2,231 | 4,462 | 2,231 | 11 |
| D8 | C15 | 3,000 | 6,000 | 3,000 | 11 |
| D9 | C18 | 3,253 | 6,506 | 3,253 | 11 |
| D10 | C19 | 2,357 | 4,620 | 2,263 | 11 |
| D11 | C37 | 1,612 | 3,224 | 1,612 | 8 |
| D12 | C39 | 1,836 | 3,672 | 1,836 | 8 |
| D13 | C40 | 1,820 | 3,640 | 1,820 | 8 |
| D14 | C28 | 1,550 | 3,100 | 1,550 | 7 |
| D15 | C29 | 1,650 | 3,347 | 1,697 | 7 |
| D16 | C30 | 1,650 | 2,900 | 1,250 | 7 |
| D17 | C31 | 1,720 | 3,440 | 1,720 | 7 |
| D18 | C32 | 1,930 | 3,860 | 1,930 | 7 |
| D19 | C38 | 1,956 | 3,912 | 1,956 | 8 |
| D20 | C1 | 2,533 | 5,066 | 2,533 | 11 |
| D21 | C2 | 2,313 | 4,626 | 2,313 | 11 |
| D22 | C4 | 2,598 | 5,302 | 2,704 | 11 |
| D23 | C9 | 2,928 | 5,856 | 2,928 | 11 |
| D24 | C10 | 3,083 | 6,186 | 3,083 | 11 |
| D25 | C13 | 2,438 | 4,780 | 2,342 | 11 |
| D26 | C15 | 3,208 | 6,416 | 3,208 | 11 |
| D27 | C18 | 3,461 | 6,922 | 3,461 | 11 |
| D28 | C19 | 2,565 | 5,130 | 2,565 | 11 |
| D29 | C37 | 1,820 | 3,714 | 1,894 | 8 |
| D30 | C39 | 2,044 | 4,088 | 2,044 | 8 |
| D31 | C40 | 2,028 | 4,056 | 2,028 | 8 |
| D32 | C28 | 1,758 | 3,516 | 1,758 | 7 |
| D33 | C29 | 1,848 | 3,623 | 1,775 | 7 |
| D34 | C30 | 1,858 | 3,384 | 1,726 | 7 |
| D35 | C31 | 1,928 | 3,935 | 2,007 | 7 |
| D36 | C32 | 2,138 | 4,364 | 2,226 | 7 |

At this point it may be desirable to direct attention to two facts, the first being that we are aware that other di-

TABLE IV

| Ex. No. | Resin used | Resin used, grams | Dissolved in xylene, grams | Sod. methylate used, grams | Polyepoxide used | Polyepoxide used, grams | Dissolved in xylene, grams | Reaction temp. range, ° C. | Approx. time of reaction, hrs. | Percentage solvent in final product |
|---|---|---|---|---|---|---|---|---|---|---|
| D1 | C38 | 1,408 | 1,000 | 25 | 3A | 340 | 500 | 100-145 | 18 | 51 |
| D2 | C1 | 1,985 | 1,000 | 35 | 3A | 340 | 500 | 90-160 | 18 | 50 |
| D3 | C2 | 1,765 | 1,000 | 32 | 3A | 340 | 500 | 80-145 | 16 | 51 |
| D4 | C4 | 2,050 | 1,000 | 36 | 3A | 340 | 500 | 80-145 | 18 | 50 |
| D5 | C9 | 2,380 | 1,000 | 41 | 3A | 340 | 500 | 80-145 | 20 | 50 |
| D6 | C10 | 2,535 | 1,000 | 43 | 3A | 340 | 500 | 90-150 | 20 | 50 |
| D7 | C13 | 1,890 | 1,000 | 33 | 3A | 340 | 500 | 90-155 | 18 | 50 |
| D8 | D15 | 2,660 | 1,000 | 45 | 3A | 340 | 500 | 80-150 | 20 | 50 |
| D9 | C18 | 2,913 | 1,000 | 49 | 3A | 340 | 500 | 90-160 | 20 | 50 |
| D10 | C19 | 2,017 | 1,000 | 38 | 3A | 340 | 500 | 90-155 | 18 | 49 |
| D11 | C27 | 1,272 | 1,000 | 24 | 3A | 340 | 500 | 90-150 | 16 | 50 |
| D12 | C39 | 1,496 | 1,000 | 28 | 3A | 340 | 500 | 90-160 | 18 | 50 |
| D13 | C40 | 1,480 | 1,000 | 27 | 3A | 340 | 500 | 90-160 | 17 | 50 |
| D14 | C28 | 1,210 | 1,000 | 25 | 3A | 340 | 500 | 85-155 | 18 | 50 |
| D15 | C29 | 1,300 | 1,000 | 26 | 3A | 340 | 500 | 90-150 | 20 | 51 |
| D16 | C30 | 1,110 | 1,000 | 23 | 3A | 340 | 500 | 95-160 | 18 | 50 |
| D17 | C31 | 1,380 | 1,000 | 28 | 3A | 340 | 500 | 90-160 | 22 | 50 |
| D18 | C32 | 1,590 | 1,000 | 32 | 3A | 340 | 500 | 85-160 | 22 | 50 |

TABLE V

| Ex. No. | Resin used | Resin used, grams | Dissolved in xylene, grams | Sod. methylate used, grams | Polyepoxide used | Polyepoxide used, grams | Dissolved in xylene, grams | Reaction temp. range, ° C. | Approx. time of reaction, hrs. | Percentage solvent in final product |
|---|---|---|---|---|---|---|---|---|---|---|
| D19 | C38 | 1,408 | 1,000 | 28 | B1 | 548 | 500 | 100-160 | 18 | 50 |
| D20 | C1 | 1,985 | 1,000 | 38 | B1 | 548 | 500 | 100-165 | 18 | 50 |
| D21 | C2 | 1,765 | 1,000 | 35 | B1 | 548 | 500 | 95-160 | 18 | 50 |
| D22 | C4 | 2,050 | 1,000 | 39 | B1 | 548 | 500 | 95-160 | 20 | 51 |
| D23 | C9 | 2,380 | 1,000 | 44 | B1 | 548 | 500 | 90-160 | 20 | 50 |
| D24 | C10 | 2,535 | 1,000 | 46 | B1 | 548 | 500 | 90-165 | 20 | 50 |
| D25 | C13 | 1,890 | 1,000 | 36 | B1 | 548 | 500 | 90-165 | 18 | 49 |
| D26 | C15 | 2,660 | 1,000 | 48 | B1 | 548 | 500 | 90-155 | 20 | 50 |
| D27 | C18 | 2,913 | 1,000 | 52 | B1 | 548 | 500 | 100-165 | 20 | 50 |
| D28 | C19 | 2,017 | 1,000 | 40 | B1 | 548 | 500 | 100-160 | 20 | 50 |
| D29 | C27 | 1,272 | 1,000 | 27 | B1 | 548 | 500 | 100-155 | 16 | 51 |
| D30 | C39 | 1,496 | 1,000 | 31 | B1 | 548 | 500 | 100-165 | 18 | 50 |
| D31 | C40 | 1,480 | 1,000 | 30 | B1 | 548 | 500 | 100-165 | 18 | 50 |
| D32 | C28 | 1,210 | 1,000 | 26 | B1 | 548 | 500 | 95-165 | 20 | 50 |
| D33 | C29 | 1,300 | 1,000 | 26 | B1 | 548 | 500 | 95-165 | 20 | 49 |
| D34 | C30 | 1,110 | 1,000 | 23 | B1 | 548 | 500 | 100-165 | 21 | 51 |
| D35 | C31 | 1,380 | 1,000 | 28 | B1 | 548 | 500 | 100-160 | 23 | 51 |
| D36 | C32 | 1,590 | 1,000 | 32 | B1 | 548 | 500 | 100-165 | 19 | 51 | epoxides free from an aromatic radical as, for example, epoxides derived from ethylene glycol, glycerine or the like, such as the following:

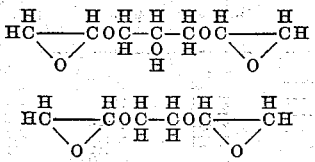

may be employed to replace the diepoxides herein described. However, such derivatives are not included as part of the instant invention.

At times we have found a tendency for an insoluble mass to tend to form or at least to obtain incipient crosslinking or gelling even when the molal ratio is in the order of 2 moles of resin to one of diepoxide. We have found this can be avoided by any one of the following procedures or their equivalent. Dilute the resin or the diepoxide, or both, with an inert solvent, such as xylene or the like. In some instances an oxygenated solvent, such as the diethyl ether of ethyleneglycol may be employed. Another procedure which is helpful is to reduce the amount of catalyst used, or reduce the temperature of reaction by adding a small amount of initially lower boiling solvent such as benzene, or use benzene entirely. Also we have found it desirable at times to use slightly less than apparently the theoretical amount of diepoxide, for instance 90% to 95% instead of 100%. The reason for this mact may reside in the possibility that the molecular weight dimensions on either the resin molecule or the diepoxide molecule may actually vary from the true molecular weight by several percent.

PART 6

In preparing oxyalkylated derivatives of products of the kind which appear as examples in Part 3, we have found it particularly advantageous to use laboratory equipment which permits continuous oxypropylation and oxyethylation. The oxyethylation step is, of course, the same as the oxypropylation step insofar that two low boiling liquids are handled in each instance. The oxyalkylation step is carried out in a manner which is substantially conventional for the oxyalkylation of compounds having labile hydrogen atoms, and for that reason a detailed description of the procedure is omitted and the process will simply be illustrated by the following examples:

Example E1

The oxyalkylation-susceptible compound employed is the one previously described and designated as D1. D1 in turn was obtained from the phenol-formaldehyde resin previously designated as C38 and having a molecular weight of approximately 700. The diepoxide employed was the one previously identified as 3A. See Table IV for more data concerning Example D1. 17.48 pounds of this resin were dissolved in 18.15 pounds of solvent (xylene) along with 1.75 pounds of finely powdered caustic soda which was employed as a catalyst. Adjustment was made in the autoclave to operate at a temperature of approximately 125° C. to 130° C. and at a pressure of about 10 to 15 pounds per square inch.

The time regulator was set so as to inject the ethylene oxide in approximately one-half hour. The reaction went readily and, as a matter of fact, was completed in less than a half-hour. Stirring was continued for a total time of about 45 minutes. The speed of reaction, particularly at the low pressure, undoubtedly was due in a large measure to excellent agitation and also to the high concentration of catalyst. The amount of ethylene oxide introduced was equal in weight to the initial diepoxide derivative (D1), i. e., 17.50 pounds. This represented a molal ratio of about 40 pounds of ethylene oxide per mole of diepoxide resin derivative. The theoretical molecular weight at the end of the reaction was approximately 3,500. A comparatively small sample, less than 50 grams, was withdrawn merely for examination as far as solubility or emulsifying power was concerned, and also for the purpose of making some tests on various oil field emulsions. The amount withdrawn was so small that no cognizance of this fact is included in the data, or in subsequent data presented in tabular form in subsequent Tables VII, VIII and IX.

The size of the autoclave employed was 25 gallons. In innumerable comparable oxyalkylations we have withdrawn a substantial portion at the end of each step and continued oxyalkylation on a partial residual sample. This was not the case in this particular series. Certain examples were duplicated as hereinafter noted and subjected to oxyalkylation with a different oxide.

Example E2

This example simply illustrates the further oxyalkylation of Example E1 preceding. As previously stated, the oxyalkylation-susceptible compound, to wit, D1, present at the beginning of the stage was obviously the same as at the end of the prior stage (Example E1) to wit, 17.48 pounds. The amount of oxide present in the initial step was 17.5 pounds, the amount of catalyst remained the same, that is, 1.75 pounds, and the amount of solvent remained the same. The amount of oxide added was another 17.5 pounds, all additions of oxide in these various stages being based on the addition of this particular amount. Thus, at the end of the oxyethylation step the amount of oxide added was a total of 35.0 pounds and the molal ratio of ethylene oxide to diepoxide resin derivative was approximately 80 to 1. The theoretical molecular weight was about 5,250. Conditions as far as temperature and pressure were concerned were the same as in the preceding period. This also applied to the reaction time.

Example E3

The oxyalkylation proceeded in the same manner as described in Examples E1 and E2. There was no added solvent and no added catalyst. The oxide added was 17.50 pounds and the total oxide in at the end of the reaction was 52.5 pounds. The molal ratio of oxide to diepoxide resin derivative was approximately 120 to 1. The temperature and pressure employed were the same as in the two preceding examples but the time of reaction was slightly longer, to wit, one hour.

Example E4

The oxyalkylation was continued and the amount of oxide added again was 17.5 pounds. There was no added catalyst and no added solvent. Theoretical molecular weight at the end of the reaction period was approximately 8,700. The molal ratio of oxide to diepoxide resin derivative was about 160 to one. The oxyalkylation conditions as far as temperature, pressure and time were concerned were the same as in preceding Example E3.

Example E5

The oxyalkylation was continued with the introduction of another 17.5 pounds of ethylene oxide. No added solvent was introduced and, likewise, no added catalyst was introduced. The theoretical molecular weight at the end of the agitation period was about 10,500. The time period, however, was increased slightly to 1½ hours instead of one hour. The conditions as far as temperature and pressure were concerned remained the same as in the preceding examples.

Example E6

The same procedure was followed as in the preceding examples with the addition of another 17.5 pounds of ethylene oxide. The total amount of oxide added at this point was 105 pounds. The molal ratio of oxide to diepoxide resin derivative was approximately 240 to 1. The theoretical molecular weight of the resin was about 12,250. The conditions of oxyethylation were the same as in previous examples except that the time period was two hours.

*Example E7*

The same procedure was followed as in the previous six examples without the addition of either caustic or solvent. The amount of oxide added at the end of the seventh period was the equivalent of 122.5 pounds. The molal ratio of oxide to diepoxide resin derivative was about 280 to 1. The molecular weight was approximately 14,000. The reaction had slowed up a bit more and although temperatures and pressures remained the same as in preceding examples, the time period was 2½ hours.

*Example E8*

This was the final oxyalkylation in this particular series. There was no added solvent and no added catalyst. The total amount of oxide added at the end of this step was 140 pounds. The theoretical molecular weight was 15,750. Conditions as far as temperature, pressure and time are concerned were the same as in Example E7, preceding.

The same procedure as described in the previous examples was employed in connection with a number of the other condensates described previously. All these data have been presented in tabular form in a series of four tables, Tables VII, VIII, IX and X.

In substantially every case a 25-gallon autoclave was employed, although in some instances the initial oxyethylation was started in a 15-gallon autoclave and then transferred to a 25-gallon autoclave. This is immaterial but happened to be a matter of convenience only. The solvent used in all cases was xylene. The catalyst used was finely powdered caustic soda.

Referring now to Table VII it will be noted that compounds E1 through E56 were obtained by the use of ethylene oxide, whereas E57 through E112 were obtained by the use of propylene oxide alone.

Thus in reference to Table VII it is to be noted as follows:

The example number of each compound is indicated in the first column.

The identity of the oxyalkylation-susceptible compound, to wit, the diepoxide treated resin, is indicated in the second column.

The amount of such derivative used is shown in the third column.

Assuming that ethylene oxide is employed, as happens to be the case in Example E1 through E56, the amount of oxide present in the oxyalkylation derivative is shown in column 4, although in the initial step since no oxide is present there is a blank.

When ethylene oxide is used exclusively the 5th column is blank.

The 6th column shows the amount of powdered caustic soda used as a catalyst, and the 7th column shows the amount of solvent xylene employed.

The 8th column states the amount of alkylene oxide derivative present in the reaction mass at the end of the period.

As pointed out previously, in this particular series the amount of reaction mass withdrawn for examination was so small that it was ignored and for this reason the resin condensate in column 8 coincides with the figure in column 3.

Column 9 shows the amount of ethylene oxide employed in the reaction mass at the end of the particular period.

Column 10 can be ignored insofar that no propylene oxide was employed.

Column 11 shows the catalyst at the end of the reaction period.

Column 12 shows the amount of solvent at the end of the reaction period.

Column 13 shows the molal ratio of ethylene oxide to derivative.

Column 14 can be ignored for the reason that no propylene oxide was employed.

Referring now to Table X. It is to be noted that the first column refers to Examples E1, E2, E3, etc.

The second column gives the maximum temperature employed during the oxyalkylation step and the third column gives the maximum pressure.

The fourth column gives the time period employed.

The last three columns show solubility tests by shaking a small amount of the compound, including the solvent present, with several volumes of water, xylene and kerosene. It sometimes happens that although xylene in comparatively small amounts will dissolve in the concentrated material, when the concentrated material in turn is diluted with xylene separation takes place.

Referring now to Table VIII, Examples E57 through E112 are the counterparts of Examples E1 through E56, except that the oxide employed is propylene oxide instead of ethylene oxide. Therefore, as explained previously, 3 columns are blank, to wit, columns 4, 9 and 13.

Reference is now made to Table IX. It is to be noted these compounds are designated by "F" numbers, F1, F2, F3, etc., through and including F32. They are derived, in turn, from compounds in the "E" series, for example, E51, E55, E107, and E111. These compounds involve the use of both ethylene oxide and propylene oxide. Since compounds E1 through E56 were obtained by the use of ethylene oxide, it is obvious that those obtained from E51 to E55, involve the use of ethylene oxide first, and propylene oxide afterward. Inversely, those compounds obtained from E107 to E111 obviously come from a prior series in which propylene oxide was used first.

In the preparation of the series indicated by the letter "E," as E49 through E56, E105 through E112, the initial "E" series such E51, E55, E167, and E111, were duplicated and the oxyalkylation stopped at the point designated instead of being carried further as may have been the case in the original oxyalkylation step. Then oxyalkylation proceeded by using the second oxide as indicated by the previous explanation, to wit, propylene oxide in F1 through F16, and ethylene oxide in F17 through F32 inclusive.

It is to be noted that reference to the catalyst in Table IX refers to the total amount of catalyst, i. e., the catalyst present from the first oxyalkylation step plus added catalyst, if any. The same is true in regard to the solvent. Reference to the solvent refers to the total solvent present, i. e., that from the first oxyalkylation step plus added solvent, if any.

It will be noted also that under the molal ratio the values of both oxides to the resin condensate are included.

The data given in regard to the operating conditions is substantially the same as before and appears in Table X.

The products resulting from these procedures may contain modest amounts, or have small amounts, of the solvents as indicated by the figures in the tables. If desired the solvent may be removed by distillation, and particularly vacuum distillation. Such distillation also may remove traces or small amounts of uncombined oxide, if present and volatile under the conditions employed.

Obviously, in the use of ethylene oxide and propylene oxide in combination one need not first use one oxide and then the other, but one can mix the two oxides and thus obtain what may be termed an indifferent oxyalkylation, i. e., no attempt to selectively add one and then the other, or any other variant.

Needless to say, one could start with ethylene oxide and then use propylene oxide, and then go back to ethylene oxide, or, inversely, start with propylene oxide, then use ethylene oxide, and then go back to propylene oxide, or, one could use a combination in which butylene oxide is used along with either one of the two oxides just mentioned, or a combination of both of them.

The resins which are employed as raw materials vary from fairly high melting resins to resins melting near the boiling point of water, to other products whose melting points are only moderately above ordinary room temperature. Such resins vary in color from almost water-white to products which are dark amber or reddish amber in appearance. In some instances they are tacky solids, or even liquids at ordinary room temperatures. After treatment with diepoxides of the kind herein employed the resultant product is usually at least as dark, perhaps darker, than the initial resin. The solvent can be removed readily by distillation, particularly vacuum distillation. The product obtained after treatment with the described diepoxide is apt to be somewhat softer and more liquid than the original material. In some instances a tackiness develops which is suggestive of cross-linking in some obscure manner.

When products of the kind previously described are intended for subsequent reaction, such as oxyalkylation, the solvent and catalyst may be permitted to remain for ultimate use.

Oxyalkylation, particularly exhaustive oxyalkylation, tends to do a number of things such as reduce the color, make the product less viscous and may even render a thin liquid, and may reduce the amount of alkalinity present.

In any event whether the solvent is to be removed, or the product bleached at either stage, is simply a matter of the intended ultimate use. If employed for the resolution of petroleum emulsions there is no need to eliminate any alkalinity and no need to eliminate color or solvent.

If the product is to be employed in the manufacture of varnish resins the procedure should be conducted so as to hold the color at a minimum, or else the final product or intermediate product can be further bleached in the usual manner using earth, bleaching chars, or the like. Ultimately the solvent could be removed in any suitable manner by distillation, including vacuum distillation.

TABLE VII

| Ex. No. | Composition before | | | | | | Composition at end | | | | | Molal ratio | | Molec. wt. based on theoretical value |
|---|---|---|---|---|---|---|---|---|---|---|---|---|---|---|
| | O-S* cmpd., ex. No. | O-S* cmpd., lbs. | Ethl. oxide, lbs. | Propl. oxide, lbs. | Catalyst, lbs. | Solvent, lbs. | O-S* cmpd., lbs. | Ethl. oxide, lbs. | Propl. oxide, lbs. | Catalyst, lbs. | Solvent, lbs. | Ethyl. oxide to oxyalkyl. suscept. cmpd. | Propl. oxide to oxyalkyl. suscept. cmpd. | |
| E1 | D1 | 17.48 | | | 1.75 | 18.15 | 17.48 | 17.50 | | 1.75 | 18.15 | 39.8 | | 3,498 |
| E2 | D1 | 17.48 | 17.50 | | 1.75 | 18.15 | 17.48 | 35.0 | | 1.75 | 18.15 | 79.5 | | 5,248 |
| E3 | D1 | 17.48 | 35.0 | | 1.75 | 18.15 | 17.48 | 52.5 | | 1.75 | 18.15 | 119.2 | | 6,998 |
| E4 | D1 | 17.48 | 52.5 | | 1.75 | 18.15 | 17.48 | 70.0 | | 1.75 | 18.15 | 159.0 | | 8,748 |
| E5 | D1 | 17.48 | 70.0 | | 1.75 | 18.15 | 17.48 | 87.5 | | 1.75 | 18.15 | 199.0 | | 10,498 |
| E6 | D1 | 17.48 | 87.5 | | 1.75 | 18.15 | 17.48 | 105.0 | | 1.75 | 18.15 | 238.2 | | 12,248 |
| E7 | D1 | 17.48 | 105.0 | | 1.75 | 18.15 | 17.48 | 122.5 | | 1.75 | 18.15 | 278.5 | | 13,998 |
| E8 | D1 | 17.48 | 122.5 | | 1.75 | 18.15 | 17.48 | 140.0 | | 1.75 | 18.15 | 318.0 | | 15,748 |
| E9 | D6 | 14.40 | | | 1.5 | 14.40 | 14.40 | 14.4 | | 1.5 | 14.4 | 65.3 | | 5,748 |
| E10 | D6 | 14.40 | 14.4 | | 1.5 | 14.40 | 14.40 | 28.8 | | 1.5 | 14.4 | 130.6 | | 8,621 |
| E11 | D6 | 14.40 | 28.8 | | 1.5 | 14.40 | 14.40 | 43.2 | | 1.5 | 14.4 | 195.9 | | 11,494 |
| E12 | D6 | 14.40 | 43.2 | | 1.5 | 14.40 | 14.40 | 57.6 | | 1.5 | 14.4 | 261.2 | | 14,367 |
| E13 | D6 | 14.40 | 57.6 | | 1.5 | 14.40 | 14.40 | 72.0 | | 1.5 | 14.4 | 326.5 | | 17,240 |
| E14 | D6 | 14.40 | 72.0 | | 1.5 | 14.40 | 14.40 | 86.4 | | 1.5 | 14.4 | 391.8 | | 20,113 |
| E15 | D6 | 14.40 | 86.4 | | 1.5 | 14.40 | 14.40 | 100.8 | | 1.5 | 14.4 | 462.0 | | 22,986 |
| E16 | D6 | 14.40 | 100.8 | | 1.5 | 14.40 | 14.40 | 115.2 | | 1.5 | 14.4 | 527.5 | | 25,859 |
| E17 | D9 | 16.25 | | | 1.5 | 16.25 | 16.25 | 16.25 | | 1.5 | 16.25 | 73.8 | | 6,503 |
| E18 | D9 | 16.25 | 16.25 | | 1.5 | 16.25 | 16.25 | 32.50 | | 1.5 | 16.25 | 147.5 | | 9,753 |
| E19 | D9 | 16.25 | 32.50 | | 1.5 | 16.25 | 16.25 | 48.75 | | 1.5 | 16.25 | 221.5 | | 13,003 |
| E20 | D9 | 16.25 | 48.75 | | 1.5 | 16.25 | 16.25 | 65.0 | | 1.5 | 16.25 | 295.2 | | 16,253 |
| E21 | D9 | 16.25 | 65.0 | | 1.5 | 16.25 | 16.25 | 81.25 | | 1.5 | 16.25 | 369.0 | | 19,503 |
| E22 | D9 | 16.25 | 81.25 | | 1.5 | 16.25 | 16.25 | 97.50 | | 1.5 | 16.25 | 442.8 | | 22,753 |
| E23 | D9 | 16.25 | 97.5 | | 1.5 | 16.25 | 16.25 | 113.75 | | 1.5 | 16.25 | 516.5 | | 25,903 |
| E24 | D9 | 16.25 | 113.75 | | 1.5 | 16.25 | 16.25 | 130.0 | | 1.5 | 16.25 | 590.5 | | 29,153 |
| E25 | D19 | 19.56 | | | 2.0 | 19.56 | 19.56 | 19.50 | | 2.0 | 19.56 | 44.4 | | 3,603 |
| E26 | D19 | 19.56 | 19.56 | | 2.0 | 19.56 | 19.56 | 39.0 | | 2.0 | 19.56 | 88.8 | | 5,856 |
| E27 | D19 | 19.56 | 39.0 | | 2.0 | 19.56 | 19.56 | 58.5 | | 2.0 | 19.56 | 133.2 | | 7,806 |
| E28 | D19 | 19.56 | 58.5 | | 2.0 | 19.56 | 19.56 | 78.0 | | 2.0 | 19.56 | 177.6 | | 9,756 |
| E29 | D19 | 19.56 | 78.0 | | 2.0 | 19.56 | 19.56 | 97.5 | | 2.0 | 19.56 | 222.0 | | 11,706 |
| E30 | D19 | 19.56 | 97.5 | | 2.0 | 19.56 | 19.56 | 117.0 | | 2.0 | 19.56 | 266.4 | | 13,656 |
| E31 | D19 | 19.56 | 117.0 | | 2.0 | 19.56 | 19.56 | 136.5 | | 2.0 | 19.56 | 310.8 | | 25,606 |
| E32 | D19 | 19.56 | 136.5 | | 2.0 | 19.56 | 19.56 | 156.0 | | 2.0 | 19.56 | 355.2 | | 27,556 |
| E33 | D24 | 15.40 | | | 1.50 | 15.40 | 15.40 | 15.5 | | 1.5 | 15.40 | 70.2 | | 6,163 |
| E34 | D24 | 15.40 | 15.5 | | 1.50 | 15.40 | 15.40 | 31.0 | | 1.5 | 15.40 | 140.4 | | 9,243 |
| E35 | D24 | 15.40 | 31.0 | | 1.50 | 15.40 | 15.40 | 46.5 | | 1.5 | 15.40 | 210.6 | | 12,323 |
| E36 | D24 | 15.40 | 46.5 | | 1.50 | 15.40 | 15.40 | 62.0 | | 1.5 | 15.40 | 280.8 | | 15,403 |
| E37 | D24 | 15.40 | 62.0 | | 1.50 | 15.40 | 15.40 | 77.5 | | 1.5 | 15.40 | 351.0 | | 18,483 |
| E38 | D24 | 15.40 | 77.5 | | 1.50 | 15.40 | 15.40 | 93.0 | | 1.5 | 15.40 | 421.2 | | 21,563 |
| E39 | D24 | 15.40 | 93.0 | | 1.50 | 15.40 | 15.40 | 108.5 | | 1.5 | 15.40 | 491.4 | | 24,643 |
| E40 | D24 | 15.40 | 108.5 | | 1.50 | 15.40 | 15.40 | 124.0 | | 1.5 | 15.40 | 561.5 | | 27,723 |
| E41 | D27 | 17.5 | | | 1.75 | 17.5 | 17.5 | 17.5 | | 1.75 | 17.50 | 78.8 | | 6,921 |
| E42 | D27 | 17.5 | 17.5 | | 1.75 | 17.5 | 17.5 | 35.0 | | 1.75 | 17.50 | 157.6 | | 10,381 |
| E43 | D27 | 17.5 | 35.0 | | 1.75 | 17.5 | 17.5 | 52.5 | | 1.75 | 17.50 | 236.4 | | 13,841 |
| E44 | D27 | 17.5 | 52.5 | | 1.75 | 17.5 | 17.5 | 70.0 | | 1.75 | 17.50 | 315.2 | | 17,301 |
| E45 | D27 | 17.5 | 70.0 | | 1.75 | 17.5 | 17.5 | 87.5 | | 1.75 | 17.50 | 374.0 | | 20,761 |
| E46 | D27 | 17.5 | 87.5 | | 1.75 | 17.5 | 17.5 | 105.0 | | 1.75 | 17.50 | 472.8 | | 24,221 |
| E47 | D27 | 17.5 | 105.0 | | 1.75 | 17.5 | 17.5 | 122.5 | | 1.75 | 17.50 | 551.6 | | 27,681 |
| E48 | D27 | 17.5 | 122.5 | | 1.75 | 17.5 | 17.5 | 140.0 | | 1.75 | 17.50 | 630.4 | | 31,141 |
| E49 | D1 | 17.48 | | | 1.0 | 18.15 | 17.48 | 8.75 | | 1.0 | 18.15 | 19.9 | | 2,623 |
| E50 | D1 | 17.48 | 8.75 | | 1.0 | 18.15 | 17.48 | 17.50 | | 1.0 | 18.15 | 39.8 | | 3,498 |
| E51 | D1 | 17.48 | 17.50 | | 1.0 | 18.15 | 17.48 | 26.25 | | 1.0 | 18.15 | 59.7 | | 4,375 |
| E52 | D1 | 17.48 | 26.25 | | 1.0 | 18.15 | 17.48 | 35.00 | | 1.0 | 18.15 | 79.5 | | 5,248 |
| E53 | D1 | 17.48 | 35.0 | | 1.0 | 18.15 | 17.48 | 43.75 | | 1.0 | 18.15 | 99.5 | | 6,123 |
| E54 | D1 | 17.48 | 43.75 | | 1.0 | 18.15 | 17.48 | 52.50 | | 1.0 | 18.15 | 110.5 | | 6,998 |
| E55 | D1 | 17.48 | 52.50 | | 1.0 | 18.15 | 17.48 | 61.25 | | 1.0 | 18.15 | 139.3 | | 7,873 |
| E56 | D1 | 17.48 | 61.25 | | 1.0 | 18.15 | 17.48 | 70.00 | | 1.0 | 18.15 | 159.0 | | 8,748 |

*Oxyalkylation-susceptible.

TABLE VIII

| Ex. No. | Composition before | | | | | | Composition at end | | | | | Molal ratio | | Molec. wt. based on theoretical value |
|---|---|---|---|---|---|---|---|---|---|---|---|---|---|---|
| | O-S* cmpd., ex. No. | O-S* cmpd., lbs. | Ethl. oxide, lbs. | Propl. oxide, lbs. | Catalyst, lbs. | Solvent, lbs. | O-S* cmpd., lbs. | Ethl. oxide, lbs. | Propl. oxide, lbs. | Catalyst, lbs. | Solvent, lbs. | Ethyl. oxide to oxyalkyl. suscept. cmpd. | Propl. oxide to oxyalkyl. suscept. cmpd. | |
| E57 | D1 | 17.48 | -------- | -------- | 1.75 | 18.15 | 17.48 | -------- | 17.5 | 1.75 | 18.15 | -------- | 30.1 | 3,496 |
| E58 | D1 | 17.48 | -------- | 17.5 | 1.75 | 18.15 | 17.48 | -------- | 35.0 | 1.75 | 18.15 | -------- | 60.2 | 5,244 |
| E59 | D1 | 17.48 | -------- | 35.0 | 1.75 | 18.15 | 17.48 | -------- | 52.5 | 1.75 | 18.15 | -------- | 90.3 | 6,992 |
| E60 | D1 | 17.48 | -------- | 52.5 | 1.75 | 18.15 | 17.48 | -------- | 70.0 | 1.75 | 18.15 | -------- | 120.4 | 8,748 |
| E61 | D1 | 17.48 | -------- | 70.0 | 1.75 | 18.15 | 17.48 | -------- | 87.5 | 1.75 | 18.15 | -------- | 150.5 | 10,488 |
| E62 | D1 | 17.48 | -------- | 87.5 | 1.75 | 18.15 | 17.48 | -------- | 105.0 | 1.75 | 18.15 | -------- | 180.6 | 12,236 |
| E63 | D1 | 17.48 | -------- | 105.0 | 1.75 | 18.15 | 17.48 | -------- | 122.5 | 1.75 | 18.15 | -------- | 210.7 | 13,984 |
| E64 | D1 | 17.48 | -------- | 122.5 | 1.75 | 18.15 | 17.48 | -------- | 140.0 | 1.75 | 18.15 | -------- | 240.8 | 15,732 |
| E65 | D6 | 14.4 | -------- | -------- | 1.5 | 14.4 | 14.4 | -------- | 14.4 | 1.5 | 14.4 | -------- | 49.5 | 5,748 |
| E66 | D6 | 14.4 | -------- | 14.4 | 1.5 | 14.4 | 14.4 | -------- | 28.8 | 1.5 | 14.4 | -------- | 99.0 | 8,621 |
| E67 | D6 | 14.4 | -------- | 28.8 | 1.5 | 14.4 | 14.4 | -------- | 43.2 | 1.5 | 14.4 | -------- | 148.5 | 11,494 |
| E68 | D6 | 14.4 | -------- | 43.2 | 1.5 | 14.4 | 14.4 | -------- | 57.6 | 1.5 | 14.4 | -------- | 198.0 | 14,367 |
| E69 | D6 | 14.4 | -------- | 57.6 | 1.5 | 14.4 | 14.4 | -------- | 72.0 | 1.5 | 14.4 | -------- | 247.5 | 17,240 |
| E70 | D6 | 14.4 | -------- | 72.0 | 1.5 | 14.4 | 14.4 | -------- | 86.4 | 1.5 | 14.4 | -------- | 297.0 | 20,113 |
| E71 | D6 | 14.4 | -------- | 86.4 | 1.5 | 14.4 | 14.4 | -------- | 100.8 | 1.5 | 14.4 | -------- | 346.5 | 22,986 |
| E72 | D6 | 14.4 | -------- | 100.8 | 1.5 | 14.4 | 14.4 | -------- | 115.2 | 1.5 | 14.4 | -------- | 396.0 | 25,859 |
| E73 | D9 | 16.25 | -------- | -------- | 1.5 | 16.25 | 16.25 | -------- | 16.25 | 1.5 | 16.25 | -------- | 56.0 | 6,503 |
| E74 | D9 | 16.25 | -------- | 16.25 | 1.5 | 16.25 | 16.25 | -------- | 32.50 | 1.5 | 16.25 | -------- | 112.0 | 9,753 |
| E75 | D9 | 16.25 | -------- | 32.50 | 1.5 | 16.25 | 16.25 | -------- | 48.75 | 1.5 | 16.25 | -------- | 168.0 | 13,003 |
| E76 | D9 | 16.25 | -------- | 48.75 | 1.5 | 16.25 | 16.25 | -------- | 65.00 | 1.5 | 16.25 | -------- | 224.0 | 16,253 |
| E77 | D9 | 16.25 | -------- | 65.00 | 1.5 | 16.25 | 16.25 | -------- | 81.25 | 1.5 | 16.25 | -------- | 280.0 | 19,503 |
| E78 | D9 | 16.25 | -------- | 81.25 | 1.5 | 16.25 | 16.25 | -------- | 97.50 | 1.5 | 16.25 | -------- | 336.0 | 22,753 |
| E79 | D9 | 16.25 | -------- | 97.50 | 1.5 | 16.25 | 16.25 | -------- | 113.75 | 1.5 | 16.25 | -------- | 392.0 | 25,903 |
| E80 | D9 | 16.25 | -------- | 113.75 | 1.5 | 16.25 | 16.25 | -------- | 130.00 | 1.5 | 16.25 | -------- | 448.0 | 29,153 |
| E81 | D19 | 19.56 | -------- | -------- | 2.0 | 19.56 | 19.56 | -------- | 19.5 | 2.0 | 19.56 | -------- | 33.6 | 3,906 |
| E82 | D19 | 19.56 | -------- | 19.5 | 2.0 | 19.56 | 19.56 | -------- | 39.0 | 2.0 | 19.56 | -------- | 67.2 | 5,856 |
| E83 | D19 | 19.56 | -------- | 39.0 | 2.0 | 19.56 | 19.56 | -------- | 58.5 | 2.0 | 19.56 | -------- | 100.8 | 7,806 |
| E84 | D19 | 19.56 | -------- | 58.5 | 2.0 | 19.56 | 19.56 | -------- | 78.0 | 2.0 | 19.56 | -------- | 134.4 | 9,756 |
| E85 | D19 | 19.56 | -------- | 78.0 | 2.0 | 19.56 | 19.56 | -------- | 97.5 | 2.0 | 19.56 | -------- | 168.0 | 11,706 |
| E86 | D19 | 19.56 | -------- | 97.5 | 2.0 | 19.56 | 19.56 | -------- | 117.0 | 2.0 | 19.56 | -------- | 201.6 | 13,656 |
| E87 | D19 | 19.56 | -------- | 117.0 | 2.0 | 19.56 | 19.56 | -------- | 136.5 | 2.0 | 19.56 | -------- | 235.2 | 25,606 |
| E88 | D19 | 19.56 | -------- | 136.5 | 2.0 | 19.56 | 19.56 | -------- | 156.0 | 2.0 | 19.56 | -------- | 266.8 | 27,556 |
| E89 | D24 | 15.4 | -------- | -------- | 1.5 | 15.40 | 15.40 | -------- | 15.5 | 1.5 | 15.40 | -------- | 53.1 | 6,163 |
| E90 | D24 | 15.4 | -------- | 15.5 | 1.5 | 15.40 | 15.40 | -------- | 31.0 | 1.5 | 15.40 | -------- | 106.2 | 9,243 |
| E91 | D24 | 15.4 | -------- | 31.0 | 1.5 | 15.40 | 15.40 | -------- | 46.5 | 1.5 | 15.40 | -------- | 159.3 | 12,323 |
| E92 | D24 | 15.4 | -------- | 46.5 | 1.5 | 15.40 | 15.40 | -------- | 62.0 | 1.5 | 15.40 | -------- | 212.4 | 15,403 |
| E93 | D24 | 15.4 | -------- | 62.0 | 1.5 | 15.40 | 15.40 | -------- | 77.5 | 1.5 | 15.40 | -------- | 265.5 | 18,483 |
| E94 | D24 | 15.4 | -------- | 77.5 | 1.5 | 15.40 | 15.40 | -------- | 93.0 | 1.5 | 15.40 | -------- | 318.6 | 21,563 |
| E95 | D24 | 15.4 | -------- | 93.0 | 1.5 | 15.40 | 15.40 | -------- | 108.5 | 1.5 | 15.40 | -------- | 371.7 | 24,643 |
| E96 | D24 | 15.4 | -------- | 108.5 | 1.5 | 15.40 | 15.40 | -------- | 124.0 | 1.5 | 15.40 | -------- | 434.8 | 27,723 |
| E97 | D27 | 17.5 | -------- | -------- | 1.75 | 17.5 | 17.5 | -------- | 17.5 | 1.75 | 17.5 | -------- | 59.6 | 6,921 |
| E98 | D27 | 17.5 | -------- | 17.5 | 1.75 | 17.5 | 17.5 | -------- | 35.0 | 1.75 | 17.5 | -------- | 119.2 | 10,381 |
| E99 | D27 | 17.5 | -------- | 35.0 | 1.75 | 17.5 | 17.5 | -------- | 52.5 | 1.75 | 17.5 | -------- | 178.8 | 13,841 |
| E100 | D27 | 17.5 | -------- | 52.5 | 1.75 | 17.5 | 17.5 | -------- | 70.0 | 1.75 | 17.5 | -------- | 238.4 | 17,301 |
| E101 | D27 | 17.5 | -------- | 70.0 | 1.75 | 17.5 | 17.5 | -------- | 87.5 | 1.75 | 17.5 | -------- | 298.0 | 20,761 |
| E102 | D27 | 17.5 | -------- | 87.5 | 1.75 | 17.5 | 17.5 | -------- | 105.0 | 1.75 | 17.5 | -------- | 357.6 | 24,221 |
| E103 | D27 | 17.5 | -------- | 105.0 | 1.75 | 17.5 | 17.5 | -------- | 122.5 | 1.75 | 17.5 | -------- | 417.2 | 27,681 |
| E104 | D27 | 17.5 | -------- | 122.5 | 1.75 | 17.5 | 17.5 | -------- | 140.0 | 1.75 | 17.5 | -------- | 478.8 | 31,141 |
| E105 | D1 | 17.48 | -------- | -------- | 1.0 | 18.15 | 17.48 | -------- | 8.75 | 1.0 | 18.15 | -------- | 15.05 | 2,623 |
| E106 | D1 | 17.48 | -------- | 8.75 | 1.0 | 18.15 | 17.48 | -------- | 17.50 | 1.0 | 18.15 | -------- | 30.10 | 3,498 |
| E107 | D1 | 17.48 | -------- | 17.50 | 1.0 | 18.15 | 17.48 | -------- | 26.25 | 1.0 | 18.15 | -------- | 45.15 | 4,375 |
| E108 | D1 | 17.48 | -------- | 26.25 | 1.0 | 18.15 | 17.48 | -------- | 35.00 | 1.0 | 18.15 | -------- | 60.20 | 5,248 |
| E109 | D1 | 17.48 | -------- | 35.00 | 1.0 | 18.15 | 17.48 | -------- | 43.75 | 1.0 | 18.15 | -------- | 75.25 | 6,123 |
| E110 | D1 | 17.48 | -------- | 43.75 | 1.0 | 18.15 | 17.48 | -------- | 52.50 | 1.0 | 18.15 | -------- | 90.30 | 6,998 |
| E111 | D1 | 17.48 | -------- | 52.50 | 1.0 | 18.15 | 17.48 | -------- | 61.25 | 1.0 | 18.15 | -------- | 105.35 | 7,873 |
| E112 | D1 | 17.48 | -------- | 61.25 | 1.0 | 18.15 | 17.48 | -------- | 70.00 | 1.0 | 18.15 | -------- | 120.4 | 8,748 |

*Oxyalkylation-susceptible.

TABLE IX

| Ex. No. | Composition before | | | | | | Composition at end | | | | | Molal ratio | | Molec. wt. based on theoretical value |
|---|---|---|---|---|---|---|---|---|---|---|---|---|---|---|
| | O-S* cmpd., ex. No. | O-S* cmpd., lbs. | Ethl. oxide, lbs. | Propl. oxide, lbs. | Catalyst, lbs. | Solvent, lbs. | O-S* cmpd., lbs. | Ethl. oxide, lbs. | Propl. oxide, lbs. | Catalyst, lbs. | Solvent, lbs. | Ethyl. oxide to oxyalkyl. suscept. cmpd. | Propl. oxide to oxyalkyl. suscept. cmpd. | |
| F1 | E51 | 17.48 | 26.25 | | 1.0 | 18.15 | 17.48 | 26.25 | 8.75 | 1.0 | 18.15 | 59.7 | 15.05 | 5,248 |
| F2 | E51 | 17.48 | 26.25 | 8.75 | 1.0 | 18.15 | 17.48 | 26.25 | 17.50 | 1.0 | 18.15 | 59.7 | 30.10 | 6,120 |
| F3 | E51 | 17.48 | 26.25 | 17.50 | 1.0 | 18.15 | 17.48 | 26.25 | 26.25 | 1.0 | 18.15 | 59.7 | 45.15 | 6,995 |
| F4 | E51 | 17.48 | 26.25 | 26.25 | 1.0 | 18.15 | 17.48 | 26.25 | 35.00 | 1.0 | 18.15 | 59.7 | 60.20 | 7,865 |
| F5 | E51 | 17.48 | 26.25 | 35.0 | 1.0 | 18.15 | 17.48 | 26.25 | 43.75 | 1.0 | 18.15 | 59.7 | 75.25 | 8,740 |
| F6 | E51 | 17.48 | 26.25 | 43.75 | 1.0 | 18.15 | 17.48 | 26.25 | 52.50 | 1.0 | 18.15 | 59.7 | 90.30 | 9,615 |
| F7 | E51 | 17.48 | 26.25 | 52.50 | 1.0 | 18.15 | 17.48 | 26.25 | 61.25 | 1.0 | 18.15 | 59.7 | 105.35 | 10,515 |
| F8 | E51 | 17.48 | 26.25 | 61.25 | 1.0 | 18.15 | 17.48 | 26.25 | 70.00 | 1.0 | 18.15 | 59.7 | 120.40 | 11,365 |
| F9 | E55 | 17.48 | 61.25 | | 1.5 | 18.15 | 17.48 | 61.25 | 8.75 | 1.5 | 18.15 | 139.3 | 15.05 | 8,746 |
| F10 | E55 | 17.48 | 61.25 | 8.75 | 1.5 | 18.15 | 17.48 | 61.25 | 17.50 | 1.5 | 18.15 | 139.3 | 30.10 | 9,618 |
| F11 | E55 | 17.48 | 61.25 | 17.50 | 1.5 | 18.15 | 17.48 | 61.25 | 26.25 | 1.5 | 18.15 | 139.3 | 45.15 | 10,493 |
| F12 | E55 | 17.48 | 61.25 | 26.25 | 1.5 | 18.15 | 17.48 | 61.25 | 35.00 | 1.5 | 18.15 | 139.3 | 60.20 | 11,363 |
| F13 | E55 | 17.48 | 61.25 | 35.00 | 1.5 | 18.15 | 17.48 | 61.25 | 43.75 | 1.5 | 18.15 | 139.3 | 75.25 | 12,238 |
| F14 | E55 | 17.48 | 61.25 | 43.75 | 1.5 | 18.15 | 17.48 | 61.25 | 61.25 | 1.5 | 18.15 | 139.3 | 105.25 | 14,013 |
| F15 | E55 | 17.48 | 61.25 | 61.25 | 1.5 | 18.15 | 17.48 | 61.25 | 78.75 | 1.5 | 18.15 | 139.3 | 135.45 | 15,723 |
| F16 | E55 | 17.48 | 61.25 | 78.75 | 1.5 | 18.15 | 17.48 | 61.25 | 96.25 | 1.5 | 18.15 | 139.3 | 165.55 | 17,473 |
| F17 | E107 | 17.48 | | 26.25 | 1.5 | 18.15 | 17.48 | 8.75 | 26.25 | 1.5 | 18.15 | 19.9 | 45.15 | 5,250 |
| F18 | E107 | 17.48 | 8.75 | 26.25 | 1.5 | 18.15 | 17.48 | 17.50 | 26.25 | 1.5 | 18.15 | 39.8 | 45.15 | 6,125 |
| F19 | E107 | 17.48 | 17.50 | 26.25 | 1.5 | 18.15 | 17.48 | 26.25 | 26.25 | 1.5 | 18.15 | 59.7 | 45.15 | 7,005 |
| F20 | E107 | 17.48 | 26.25 | 26.25 | 1.5 | 18.15 | 17.48 | 35.00 | 26.25 | 1.5 | 18.15 | 79.5 | 45.15 | 7,875 |
| F21 | E107 | 17.48 | 35.0 | 26.25 | 1.5 | 18.15 | 17.48 | 43.75 | 26.25 | 1.5 | 18.15 | 99.5 | 45.15 | 8,750 |
| F22 | E107 | 17.48 | 43.75 | 26.25 | 1.5 | 18.15 | 17.48 | 52.50 | 26.25 | 1.5 | 18.15 | 119.5 | 45.15 | 9,635 |
| F23 | E107 | 17.48 | 52.50 | 26.25 | 1.5 | 18.15 | 17.48 | 61.25 | 26.25 | 1.5 | 18.15 | 139.3 | 45.15 | 10,510 |
| F24 | E107 | 17.48 | 61.25 | 26.25 | 1.5 | 18.15 | 17.48 | 70.00 | 26.25 | 1.5 | 18.15 | 159.0 | 45.15 | 11,375 |
| F25 | E111 | 17.48 | | 61.25 | 1.5 | 18.15 | 17.48 | 8.75 | 61.25 | 1.5 | 18.15 | 19.9 | 105.35 | 8,748 |
| F26 | E111 | 17.48 | 8.75 | 61.25 | 1.5 | 18.15 | 17.48 | 17.50 | 61.25 | 1.5 | 18.15 | 39.8 | 105.35 | 9,623 |
| F27 | E111 | 17.48 | 17.50 | 61.25 | 1.5 | 18.15 | 17.48 | 26.25 | 61.25 | 1.5 | 18.15 | 59.7 | 105.35 | 10,503 |
| F28 | E111 | 17.48 | 26.25 | 61.25 | 1.5 | 18.15 | 17.48 | 35.0 | 61.25 | 1.5 | 18.15 | 79.5 | 105.35 | 11,373 |
| F29 | E111 | 17.48 | 35.00 | 61.25 | 1.5 | 18.15 | 17.48 | 43.75 | 61.25 | 1.5 | 18.15 | 99.5 | 105.35 | 12,248 |
| F30 | E111 | 17.48 | 43.75 | 61.25 | 1.5 | 18.15 | 17.48 | 52.50 | 61.25 | 1.5 | 18.15 | 119.5 | 105.35 | 13,133 |
| F31 | E111 | 17.48 | 52.50 | 61.25 | 1.5 | 18.15 | 17.48 | 61.25 | 61.25 | 1.5 | 18.15 | 139.3 | 105.35 | 14,008 |
| F32 | E111 | 17.48 | 61.25 | 61.25 | 1.5 | 18.15 | 17.48 | 70.00 | 61.25 | 1.5 | 18.15 | 159.0 | 105.35 | 14,873 |

*Oxyalkylation-susceptible.

TABLE X

| Ex. No. | Max. temp., °C. | Max. pres., p.s.i. | Time, hrs. | Solubility | | |
|---|---|---|---|---|---|---|
| | | | | Water | Xylene | Kerosene |
| E1 | 125–130 | 10–15 | ¾ | Insoluble | | |
| E2 | 125–130 | 10–15 | ¾ | Emulsifiable | | |
| E3 | 125–130 | 10–15 | 1 | Soluble | | |
| E4 | 125–130 | 10–15 | 1 | ---do--- | | |
| E5 | 125–130 | 10–15 | 1½ | ---do--- | | |
| E6 | 125–130 | 10–15 | 2 | ---do--- | | |
| E7 | 125–130 | 10–15 | 2½ | ---do--- | | |
| E8 | 125–130 | 10–15 | 2½ | ---do--- | | |
| E9 | 125–130 | 10–15 | ½ | Insoluble | | |
| E10 | 125–130 | 10–15 | ¾ | Insoluble to emulsifiable | | |
| E11 | 125–130 | 10–15 | ¾ | Soluble | | |
| E12 | 125–130 | 10–15 | 1 | ---do--- | | |
| E13 | 125–130 | 10–15 | 1 | ---do--- | | |
| E14 | 125–130 | 10–15 | 1 | ---do--- | | |
| E15 | 125–130 | 10–15 | 1½ | ---do--- | | |
| E16 | 125–130 | 10–15 | 2 | ---do--- | | |
| E17 | 125–130 | 10–15 | ¾ | Insoluble | | |
| E18 | 125–130 | 10–15 | ¾ | ---do--- | | |
| E19 | 125–130 | 10–15 | 1 | Emulsifiable | | |
| E20 | 125–130 | 10–15 | 1½ | Soluble | | |
| E21 | 125–130 | 10–15 | 2 | ---do--- | | |
| E22 | 125–130 | 10–15 | 2 | ---do--- | | |
| E23 | 125–130 | 10–15 | 2¾ | ---do--- | | |
| E24 | 125–130 | 10–15 | 3 | ---do--- | | |
| E25 | 125–130 | 10–15 | 1¼ | Insoluble | | |
| E26 | 125–130 | 10–15 | 1½ | Emulsifiable to soluble | | |
| E27 | 125–130 | 10–15 | 2 | ---do--- | | |
| E28 | 125–130 | 10–15 | 2 | ---do--- | | |
| E29 | 125–130 | 10–15 | 2 | ---do--- | | |
| E30 | 125–130 | 10–15 | 2½ | ---do--- | | |
| E31 | 125–130 | 10–15 | 2¾ | ---do--- | | |
| E32 | 125–130 | 10–15 | 3¼ | ---do--- | | |
| E33 | 125–130 | 10–15 | ¾ | Insoluble | | |
| E34 | 125–130 | 10–15 | ¾ | Insoluble to emulsifiable | | |
| E35 | 125–130 | 10–15 | 1 | Emulsifiable | | |
| E36 | 125–130 | 10–15 | 1 | Soluble | | |
| E37 | 125–130 | 10–15 | 1½ | ---do--- | | |
| E38 | 125–130 | 10–15 | 2 | ---do--- | | |
| E39 | 125–130 | 10–15 | 2¼ | ---do--- | | |
| E40 | 125–130 | 10–15 | 2¾ | ---do--- | | |
| E41 | 125–130 | 10–15 | 1 | Insoluble | | |
| E42 | 125–130 | 10–15 | 1 | ---do--- | | |
| E43 | 125–130 | 10–15 | 1½ | Emulsifiable | | |
| E44 | 125–130 | 10–15 | 1½ | ---do--- | | |
| E45 | 125–130 | 10–15 | 1¾ | Soluble | | |
| E46 | 125–130 | 10–15 | 2 | ---do--- | | |
| E47 | 125–130 | 10–15 | 2½ | ---do--- | | |
| E48 | 125–130 | 10–15 | 3 | ---do--- | | |

TABLE X—Continued

| Ex. No. | Max. temp., °C. | Max. pres., p.s.i. | Time, hrs. | Solubility Water | Solubility Xylene | Solubility Kerosene |
|---|---|---|---|---|---|---|
| E49 | 125-130 | 10-15 | ¼ | Insoluble | | |
| E50 | 125-130 | 10-15 | ¼ | ---do--- | | |
| E51 | 125-130 | 10-15 | ½ | Emulsifiable | | |
| E52 | 125-130 | 10-15 | ½ | ---do--- | | |
| E53 | 125-130 | 10-15 | ¾ | Soluble | | |
| E54 | 125-130 | 10-15 | ¾ | ---do--- | | |
| E55 | 125-130 | 10-15 | ¾ | ---do--- | | |
| E56 | 125-130 | 10-15 | 1 | ---do--- | | |
| E57 | 125-130 | 10-15 | 1 | Insoluble | Soluble | Insoluble. |
| E58 | 125-130 | 10-15 | 1¼ | ---do--- | ---do--- | Do. |
| E59 | 125-130 | 10-15 | 1½ | ---do--- | ---do--- | Dispersible. |
| E60 | 125-130 | 10-15 | 2 | ---do--- | ---do--- | Soluble. |
| E61 | 125-130 | 10-15 | 2½ | ---do--- | ---do--- | Do. |
| E62 | 125-130 | 10-15 | 3 | ---do--- | ---do--- | Do. |
| E63 | 125-130 | 10-15 | 3½ | ---do--- | ---do--- | Do. |
| E64 | 125-130 | 10-15 | 4½ | ---do--- | ---do--- | Do. |
| E65 | 125-130 | 10-15 | 1 | ---do--- | ---do--- | Insoluble. |
| E66 | 125-130 | 10-15 | 1 | ---do--- | ---do--- | Do. |
| E67 | 125-130 | 10-15 | 1½ | ---do--- | ---do--- | Dispersible. |
| E68 | 125-130 | 10-15 | 2 | ---do--- | ---do--- | Soluble. |
| E69 | 125-130 | 10-15 | 2½ | ---do--- | ---do--- | Do. |
| E70 | 125-130 | 10-15 | 2¾ | ---do--- | ---do--- | Do. |
| E71 | 125-130 | 10-15 | 3 | ---do--- | ---do--- | Do. |
| E72 | 125-130 | 10-15 | 3½ | ---do--- | ---do--- | Do. |
| E73 | 125-130 | 10-15 | 1¼ | ---do--- | ---do--- | Insoluble. |
| E74 | 125-130 | 10-15 | 1½ | ---do--- | ---do--- | Do. |
| E75 | 125-130 | 10-15 | 1½ | ---do--- | ---do--- | Soluble. |
| E76 | 125-130 | 10-15 | 2 | ---do--- | ---do--- | Do. |
| E77 | 125-130 | 10-15 | 2½ | ---do--- | ---do--- | Do. |
| E78 | 125-130 | 10-15 | 3 | ---do--- | ---do--- | Do. |
| E79 | 125-130 | 10-15 | 4 | ---do--- | ---do--- | Do. |
| E80 | 125-130 | 10-15 | 4½ | ---do--- | ---do--- | Do. |
| E81 | 125-130 | 10-15 | 1¾ | ---do--- | ---do--- | Insoluble. |
| E82 | 125-130 | 10-15 | 2 | ---do--- | ---do--- | Do. |
| E83 | 125-130 | 10-15 | 2½ | ---do--- | ---do--- | Insoluble to dispersible. |
| E84 | 125-130 | 10-15 | 3 | ---do--- | ---do--- | Dispersible. |
| E85 | 125-130 | 10-15 | 3 | ---do--- | ---do--- | Soluble. |
| E86 | 125-130 | 10-15 | 4 | ---do--- | ---do--- | Do. |
| E87 | 125-130 | 10-15 | 4½ | ---do--- | ---do--- | Do. |
| E88 | 125-130 | 10-15 | 5 | ---do--- | ---do--- | Do. |
| E89 | 125-130 | 10-15 | 2 | ---do--- | ---do--- | Insoluble. |
| E90 | 125-130 | 10-15 | 2 | ---do--- | ---do--- | Do. |
| E91 | 125-130 | 10-15 | 2½ | ---do--- | ---do--- | Soluble. |
| E92 | 125-130 | 10-15 | 3 | ---do--- | ---do--- | Do. |
| E93 | 125-130 | 10-15 | 3½ | ---do--- | ---do--- | Do. |
| E94 | 125-130 | 10-15 | 4 | ---do--- | ---do--- | Do. |
| E95 | 125-130 | 10-15 | 5 | ---do--- | ---do--- | Do. |
| E96 | 125-130 | 10-15 | 6 | ---do--- | ---do--- | Do. |
| E97 | 125-130 | 10-15 | 2½ | ---do--- | ---do--- | Insoluble. |
| E98 | 125-130 | 10-15 | 3 | ---do--- | ---do--- | Do. |
| E99 | 125-130 | 10-15 | 3½ | ---do--- | ---do--- | Soluble. |
| E100 | 125-130 | 10-15 | 4 | ---do--- | ---do--- | Do. |
| E101 | 125-130 | 10-15 | 5 | ---do--- | ---do--- | Do. |
| E102 | 125-130 | 10-15 | 5½ | ---do--- | ---do--- | Do. |
| E103 | 125-130 | 10-15 | 6 | ---do--- | ---do--- | Do. |
| E104 | 125-130 | 10-15 | 7 | ---do--- | ---do--- | Do. |
| E105 | 125-130 | 10-15 | ½ | ---do--- | ---do--- | Insoluble. |
| E106 | 125-130 | 10-15 | ¾ | ---do--- | ---do--- | Do. |
| E107 | 125-130 | 10-15 | ¾ | ---do--- | ---do--- | Do. |
| E108 | 125-130 | 10-15 | 1½ | ---do--- | ---do--- | Do. |
| E109 | 125-130 | 10-15 | 1½ | ---do--- | ---do--- | Do. |
| E110 | 125-130 | 10-15 | 1¾ | ---do--- | ---do--- | Dispersible. |
| E111 | 125-130 | 10-15 | 2 | ---do--- | ---do--- | Do. |
| E112 | 125-130 | 10-15 | 2 | ---do--- | ---do--- | Soluble. |
| F1 | 125-130 | 10-15 | 1½ | Emulsifiable | Insoluble | Insoluble. |
| F2 | 125-130 | 10-15 | ½ | ---do--- | Soluble | Do. |
| F3 | 125-130 | 10-15 | 1 | Insoluble | ---do--- | Do. |
| F4 | 125-130 | 10-15 | 1½ | ---do--- | ---do--- | Do. |
| F5 | 125-130 | 10-15 | 2 | ---do--- | ---do--- | Do. |
| F6 | 125-130 | 10-15 | 2 | ---do--- | ---do--- | Do. |
| F7 | 125-130 | 10-15 | 2½ | ---do--- | ---do--- | Do. |
| F8 | 125-130 | 10-15 | 3 | ---do--- | ---do--- | Soluble. |
| F9 | 125-130 | 10-15 | 3½ | Soluble | Insoluble | Insoluble. |
| F10 | 125-130 | 10-15 | ½ | ---do--- | ---do--- | Do. |
| F11 | 125-130 | 10-15 | ¾ | ---do--- | ---do--- | Do. |
| F12 | 125-130 | 10-15 | 1½ | ---do--- | Soluble | Do. |
| F13 | 125-130 | 10-15 | 2 | Emulsifiable | ---do--- | Do. |
| F14 | 125-130 | 10-15 | 2½ | Insoluble | ---do--- | Do. |
| F15 | 125-130 | 10-15 | 3 | ---do--- | ---do--- | Do. |
| F16 | 125-130 | 10-15 | 4 | ---do--- | ---do--- | Soluble. |
| F17 | 125-130 | 10-15 | 2¼ | ---do--- | ---do--- | Insoluble. |
| F18 | 125-130 | 10-15 | ½ | ---do--- | ---do--- | Do. |
| F19 | 125-130 | 10-15 | ½ | ---do--- | ---do--- | Do. |
| F20 | 125-130 | 10-15 | ¾ | Soluble | ---do--- | Do. |
| F21 | 125-130 | 10-15 | 1 | ---do--- | ---do--- | Do. |
| F22 | 125-130 | 10-15 | 1½ | ---do--- | ---do--- | Do. |
| F23 | 125-130 | 10-15 | 1½ | ---do--- | ---do--- | Do. |
| F24 | 125-130 | 10-15 | 2 | ---do--- | ---do--- | Do. |
| F25 | 125-130 | 10-15 | 8¼ | Insoluble | ---do--- | Dispersible. |
| F26 | 125-130 | 10-15 | 1 | ---do--- | ---do--- | Insoluble. |
| F27 | 125-130 | 10-15 | 1½ | ---do--- | ---do--- | Do. |
| F28 | 125-130 | 10-15 | 1¾ | Emulsifiable | ---do--- | Do. |
| F29 | 125-130 | 10-15 | 2 | ---do--- | ---do--- | Do. |
| F30 | 125-130 | 10-15 | 2 | Soluble | ---do--- | Do. |
| F31 | 125-130 | 10-15 | 2½ | ---do--- | ---do--- | Do. |
| F32 | 125-130 | 10-15 | 3 | ---do--- | ---do--- | Do. |

NOTE.—In the above table, the time period in regard to F1, F9, F17, and F25 is the total time for both oxyalkylation stages. In respect to all others the time period indicated is the time required to introduce the second alkylene oxide employed.

PART 7

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials of our invention when employed as demulsifying agents.

The materials of our invention, when employed as treating or demulsifying agents, are used in the conventional way, well known to the art, described, for example, in Patent 2,626,929, dated January 27, 1953, Part 3, and reference is made thereto for a description of conventional procedures of demulsifying, including batch, continuous, and down-the-hole demulsification, the process essentially involving introducing a small amount of demulsifier into a large amount of emulsion with adequate admixture with or without the application of heat, and allowing the mixture to stratify.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example F12 with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example F12, 20%;
A cyclohexylamine salt of a polypropylated napthalene monosulfonic acid, 24%;
An ammonium salt of a polypropylated napthalene monosulfonic acid, 24%;
A sodium salt of oil-soluble mahogany petroleum sulfonic acid, 12%;
A high-boiling aromatic petroleum solvent, 15%;
Isopropyl alcohol, 5%.

The above proportions are all weight percents.

PART 8

The intermediate resinous products described in Part 5, preceding, can be oxyalkylated and employed for various purposes and particularly for the resolution of petroleum emulsions of the water-in-oil type as described in detail in Part 7, immediately preceding.

Such resinous products, however, without being subjected to oxyalkylation can serve for other uses as, described in U. S. Patent No. 2,610,955, dated September 16, 1952, to De Groote and Keiser. Furthermore, such resinous materials can be reacted with alkylene imines, such as ethylene imine or propylene imine, to produce cation-active materials. Instead of an imine, one may employ what is a somewhat equivalent material, to wit, a dialkylamino-epoxypropane of the structure

wherein R' and R" are alkyl groups.

It is not necessary to point out that after reaction with a reactant of the kind described which introduces a basic nitrogen atom the resultant product can then be subjected to the oxyalkylation procedures described in detail in Part 6, preceding.

Referring now to the use of the oxyalkylated products obtained in the manner described in Part 6, preceding, it is to be noted that in addition to their use in the resolution of petroleum emulsions they may be used as emulsifying agents for oils, fats, and waxes, as ingredients in insecticide compositions, or as detergents and wetting agents in the laundering, scouring, dyeing, tanning and mordanting industries. They may also be used for preparing boring or metal-cutting oils and cattle dips, as metal pickling inhibitors, and for pharmaceutical purposes.

Not only do these oxyalkylated derivatives have their utility as such but they can serve as initial materials for more complicated reactions of the kind ordinarily requiring a hydroxyl radical. This includes esterification, etherization, etc.

The oxyalkylated derivatives may be used as valuable additives to lubricating oils, both those derived from petroleum and synthetic lubricating oils. Also, they can be used as additives to hydraulic brake fluids of the aqueous and nonaqueous types. They may be used in connection with other processes where they are injected into an oil or gas well for purpose of removing a mud sheath, increasing the ultimate flow of fluid from the surrounding strata, and particularly in secondary recovery operations using aqueous flood waters. These derivatives also are suitable for use in dry cleaners' soaps.

Comparable compounds which can serve the various purposes previously enumerated, in both the resinous stage and the oxyalkylated stage, are obtained from another class of resins, i. e., those in which the phenolic nuclei are separated by a radical having at least a 3-carbon atom chain and are obtained, not by the use of a single aldehyde but by the use of formaldehyde, in combination with a carbonyl compound selected from the class of aldehydes and ketones in which there is an alpha hydrogen atom available as in the case of acetaldehyde or acetone. Such resins almost invariably involve the use of a basic catalyst. Such bridge radicals between phenolic nuclei have either hydroxyl radicals or carbonyl radicals, or both, and are invariably oxyalkylation-susceptible and may also enter into more complicated reactants with basic secondary amines. The bridge radical in the initial resin has distinct hydrophile character. Such resins or compounds which can be converted readily into such resins are described in the following patents. Such analogous compounds are not included as part of the instant invention.

U. S. Patent Nos.: 2,191,802, dated February 27, 1940, to Novotny et al.; 2,448,664, dated September 27, 1948, to Fife et al.; 2,538,883, dated January 23, 1951, to Schrimpe; 2,538,884, dated January 23, 1951, to Schrimpe; 2,545,559, dated March 20, 1951, to Schrimpe; 2,570,389, dated October 9, 1951, to Shcrimpe.

Having thus described our invention, what we claim as new and desire to obtain by Letters Patent, is:

1. The process of condensing (A) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

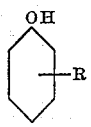

in which R is a hydrocarbon radical having at least 4 and not more than 18 carbon atoms and substituted in the 2,4,6 position; and (B) phenolic epoxides containing at least two 1,2-epoxy rings being principally phenolic diepoxides; said epoxides being free from reactive functional groups other than 1,2-epoxy and hydroxyl groups, and including additionally cogenerically associated compounds formed in the preparation of said diepoxides; said epoxides being monomers and low molal polymers not exceeding the tetramer; said epoxides being selected from the class consisting of (a) compounds where the phenolic nuclei are directly joined without an intervening bridge radical, and (b) compounds containing a radical in which two phenolic nuclei are joined by a divalent radical selected from the class consisting of ketone residues formed by the elimination of the ketonic oxygen atom, and aldehyde residues obtained by the elimination of the aldehydic oxygen atom, the divalent radical

the divalent

radical, the divalent sulfone radical, and the divalent monosulfide radical —S—, the divalent radical

—CH$_2$SCH$_2$— and the divalent disulfide radical —S—S—; said phenolic portion of the diepoxide being obtained from a phenol of the structure

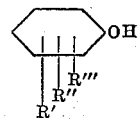

in which R', and R'', and R''' represent a member of the class consisting of hydrogen and hydrocarbon substituents of the aromatic nucleus, said substituent member having not over 18 carbon atoms; with the proviso that the molar ratio of reactant (A) to reactant (B) be approximately 2 to 1 respectively; with the further proviso that said reactive compounds (A) and (B) be members of the class consisting of non-thermosetting organic solvent-soluble liquids and low-melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

2. The process of condensing (A) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

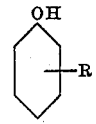

in which R is a hydrocarbon radical having at least 4 and not more than 18 carbon atoms and substituted in the 2,4,6 position; and (B) a phenolic diepoxide containing two 1,2-epoxy rings and being free from reactive functional groups other than 1,2-epoxy and hydroxyl groups, and cogenerically associated compounds formed in the preparation of said diepoxides; said epoxides being monomers and low molal polymers not exceeding the tetramers; said epoxides being selected from the class consisting of (a) compounds where the phenolic nuclei are directly joined without an intervening bridge radical, and (b) compounds containing a radical in which two phenolic nuclei are joined by a divalent radical selected from the class consisting of ketone residues formed by the elimination of the ketonic oxygen atom, and aldehyde residues obtained by the elimination of the aldehydic oxygen atom, the divalent radical

the divalent

radical, the divalent sulfone radical, and the divalent monosulfide radical —S—, the divalent radical

—CH$_2$SCH$_2$— and the divalent disulfide radical —S—S—; said phenolic portion of the diepoxide being obtained from a phenol of the structure

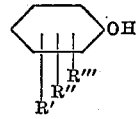

in which R', R'', and R''' represent a member of the class consisting of hydrogen and hydrocarbon substituents of the aromatic nucleus, said substitutent member having not over 18 carbon atoms; with the proviso that the molar ratio of reactant (A) to reactant (B) be approximately 2 to 1 respectively; with the further proviso that said reactive compounds (A) and (B) be members of the class consisting of non-thermosetting organic solvent-soluble liquids and low-melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

3. The process of condensing (A) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

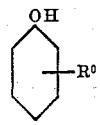

in which R⁰ is a hydrocarbon radical having at least 4 and not more than 18 carbon atoms and substituted in the 2,4,6 position; and (B) a member of the class consisting of (1) compounds of the following formula

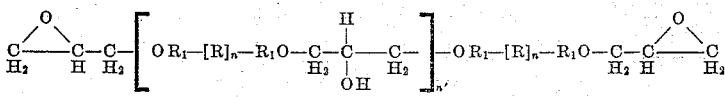

in which R represents a divalent radical selected from the class consisting of ketone residues formed by the elimination of the ketonic oxygen atom and aldehyde residues obtained by the elimination of the aldehydric oxygen atom, the divalent radical

the divalent

radical, the sulfone radical, and the divalent monosulfide radical —S—, the divalent radical —CH₂SCH₂—, and the divalent disulfide radical —S—S—; and R₁O is the divalent radical obtained by the elimination of a hydroxyl hydrogen atom and a nuclear hydrogen atom from the phenol

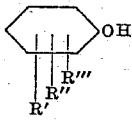

in which R′, and R″, and R‴ represent a member of the class consisting of hydrogen and hydrocarbon substituents of the aromatic nucleus, said substitutent member having not over 18 carbon atoms; $n$ represents an integer selected from the class of zero and 1, and $n'$ represents a whole number not greater than 3; and (2) cogenerically associated compounds formed in the preparation of (1) preceding, including monoepoxides; with the proviso that the molar ratio of reactant (A) to reactant (B) be approximately 2 to 1 respectively; with the further proviso that said reactive compounds (A) and (B) be members of the class consisting of non-thermosetting organic solvent-soluble liquids and low melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

4. The process of condensing (A) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

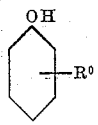

in which R⁰ is a hydrocarbon radical having at least 4 and not more than 18 carbon atoms and substituted in the 2,4,6 position; and (B) a member of the class consisting of (1) compounds of the following formula:

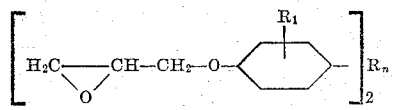

wherein R is essentially an aliphatic hydrocarbon bridge, each $n$ independently has one of the values 0 to 1, and $R_1$ is an alkyl radical containing from 1 to 4 carbon atoms, or even 12 carbon atoms, and (2) cogenerically associated compounds formed in the preparation of (1) preceding, including monoepoxides; with the proviso that (B) consist principally of the monomer as distinguished from other cogeners; the ratio of reactant (A) to reactant (B) being approximately 2 to 1 respectively; with the further proviso that said reactive compounds (A) to (B) be members of the class consisting of non-thermosetting organic solvent-soluble liquids and low-melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

5. The process of condensing (A) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

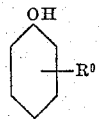

in which R⁰ is a hydrocarbon radical having at least 4 and not more than 18 carbon atoms and substituted in the 2,4,6 position; and (B) a member of the class consisting of (1) compounds of the following formula

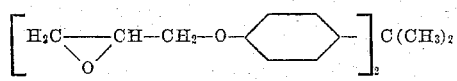

and (2) cogenerically associated compounds formed in the preparation of (1) preceding, including monoepoxides, with the proviso that (B) consist principally of the monomer as distinguished from other cogeners; the ratio of reactant (A) to reactant (B) being in the proportion of approximately two moles of (A) to one mole of (B); with the further proviso that said reactive compounds (A) and (B) be members of the class consisting of non-thermosetting organic solvent-soluble liquids and low-melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

6. The product obtained in the process defined in claim 1.

7. The product obtained in the process defined in claim 5.

8. The process of oxyalkylating by means of a compound selected from the class consisting of ethylene oxide, propylene oxide, butylene oxide, glycide and methylglycide the reaction products obtained by the process of claim 1.

9. The process of oxyalkylating by means of a compound selected from the class consisting of ethylene oxide, propylene oxide, butylene oxide, glycide and methylglycide the reaction products obtained by the process of claim 2.

10. The process of oxyalkylating by means of a compound selected from the class consisting of ethylene oxide, propylene oxide, butylene oxide, glycide and methylglycide the reaction products obtained by the process of claim 3.

11. The process of oxyalkylating by means of a compound selected from the class consisting of ethylene oxide, propylene oxide, butylene oxide, glycide and methylglycide the reaction products obtained by the process of claim 4.

12. The process of oxyalkylating by means of a compound selected from the class consisting of ethylene oxide, propylene oxide, butylene oxide, glycide and methylglycide the reaction products obtained by the process of claim 5.

13. The product obtained by the process defined in claim 8.

14. The product obtained by the process defined in claim 12.

References Cited in the file of this patent
UNITED STATES PATENTS

| | | |
|---|---|---|
| 2,499,365 | De Groote et al. | Mar. 7, 1950 |
| 2,521,911 | Greenlee | Sept. 12, 1950 |
| 2,723,241 | De Groote et al. | Nov. 8, 1955 |
| 2,723,249 | De Groote | Nov. 8, 1955 |